US012614543B1

(12) United States Patent
Alexandridis et al.

(10) Patent No.: US 12,614,543 B1
(45) Date of Patent: Apr. 28, 2026

(54) SYSTEMS AND METHODS FOR ON-DEVICE SPOKEN LANGUAGE UNDERSTANDING

(71) Applicant: Amazon Technologies, Inc., Seattle, WA (US)

(72) Inventors: Anastasios Alexandridis, Pittsburgh, PA (US); Kanthashree Mysore Sathyendra, Mountain View, CA (US); Grant Strimel, Presto, PA (US); Pavel Kveton, Pittsburgh, PA (US); Jon A. Webb, Pittsburgh, PA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 803 days.

(21) Appl. No.: 17/670,785

(22) Filed: Feb. 14, 2022

(51) Int. Cl.
| | |
|---|---|
| *G10L 15/26* | (2006.01) |
| *G06F 40/279* | (2020.01) |
| *G10L 15/18* | (2013.01) |
| *G10L 15/22* | (2006.01) |
| G10L 15/08 | (2006.01) |
| G10L 15/30 | (2013.01) |

(52) U.S. Cl.
CPC ........ *G10L 15/1815* (2013.01); *G06F 40/279* (2020.01); *G10L 15/22* (2013.01); *G10L 2015/088* (2013.01); *G10L 2015/223* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 10,311,867 B2 * | 6/2019 | Ito | | G06F 16/90332 |
| 11,809,483 B2 * | 11/2023 | Orr | | H04N 21/41265 |
| 11,817,090 B1 * | 11/2023 | Moore | | G10L 15/1822 |
| 12,198,689 B1 * | 1/2025 | Whitenack | | G10L 15/16 |
| 12,288,552 B2 * | 4/2025 | Elango | | G06Q 30/016 |
| 12,332,896 B1 * | 6/2025 | Xu | | G06F 16/24549 |
| 2015/0286747 A1 * | 10/2015 | Anastasakos | | G06F 16/9535 |
| | | | | 707/776 |
| 2016/0055240 A1 * | 2/2016 | Tur | | G06F 40/284 |
| | | | | 707/706 |
| 2019/0164540 A1 * | 5/2019 | Park | | G06F 40/284 |
| 2019/0377790 A1 * | 12/2019 | Redmond | | G06F 40/205 |
| 2022/0229993 A1 * | 7/2022 | Vu | | G06V 30/19147 |
| 2023/0134696 A1 * | 5/2023 | Yoshida | | G10L 15/08 |
| | | | | 704/200 |

(Continued)

*Primary Examiner* — Neeraj Sharma
(74) *Attorney, Agent, or Firm* — Pierce Atwood LLP

(57) ABSTRACT

Techniques for performing spoken language understanding (SLU) processing on a device are described. Example embodiments involve a device determining whether a spoken input corresponds to a supported spoken input class, a supported spoken input with dynamic content class or an unsupported spoken input class. For a spoken input corresponding to the supported spoken input with dynamic content class, the device may determine an entity corresponding to the spoken input from a set of entities, which may be determined based on device context data and/or user profile data. For a spoken input corresponding to the supported spoken input class, the device may determine an intent and entity using stored data. For a spoken input corresponding to the unsupported spoken input class, the device may send the audio data to a system for processing.

20 Claims, 12 Drawing Sheets

(56)                    References Cited

U.S. PATENT DOCUMENTS

| | | | | |
|---|---|---|---|---|
| 2023/0214593 A1* | 7/2023 | Padukone | ............... | G06F 40/35 |
| | | | | 704/2 |
| 2023/0252979 A1* | 8/2023 | Fage | ....................... | G10L 25/21 |
| | | | | 704/257 |
| 2024/0331694 A1* | 10/2024 | Yao | ......................... | G10L 15/22 |
| 2025/0045509 A1* | 2/2025 | Edwards | ................ | G06F 40/30 |
| 2025/0190466 A1* | 6/2025 | Barros | ................. | G06F 40/289 |

* cited by examiner

Figure 1C:
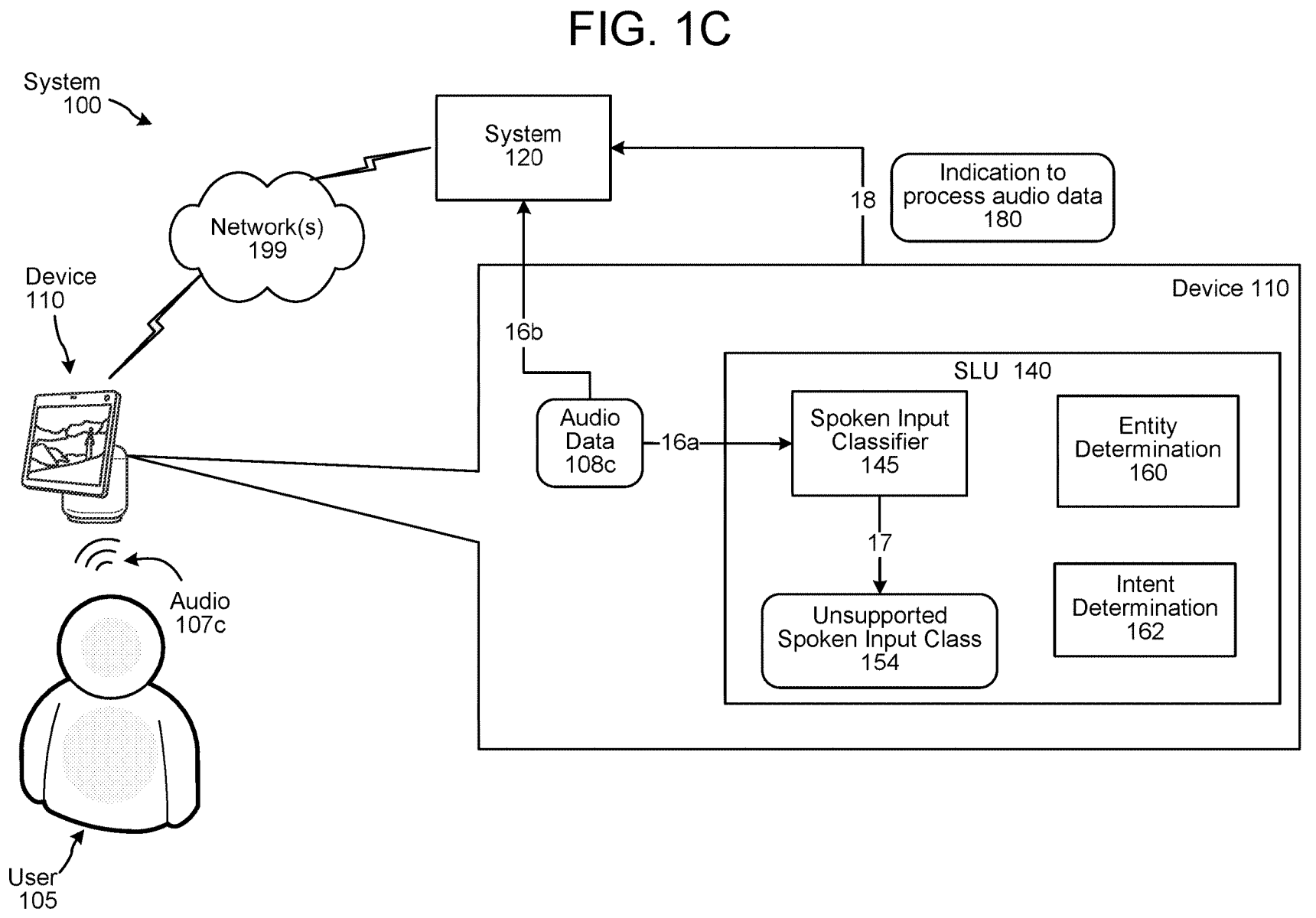

Device 110

SLU 140

Entity Determination 160

Intent Determination 162

Spoken Input Classifier 145

Unsupported Spoken Input Class 154

Indication to process audio data 180

Audio Data 108c

System 120

System 100

Device 110

Network(s) 199

Audio 107c

User 105

Figure 10:
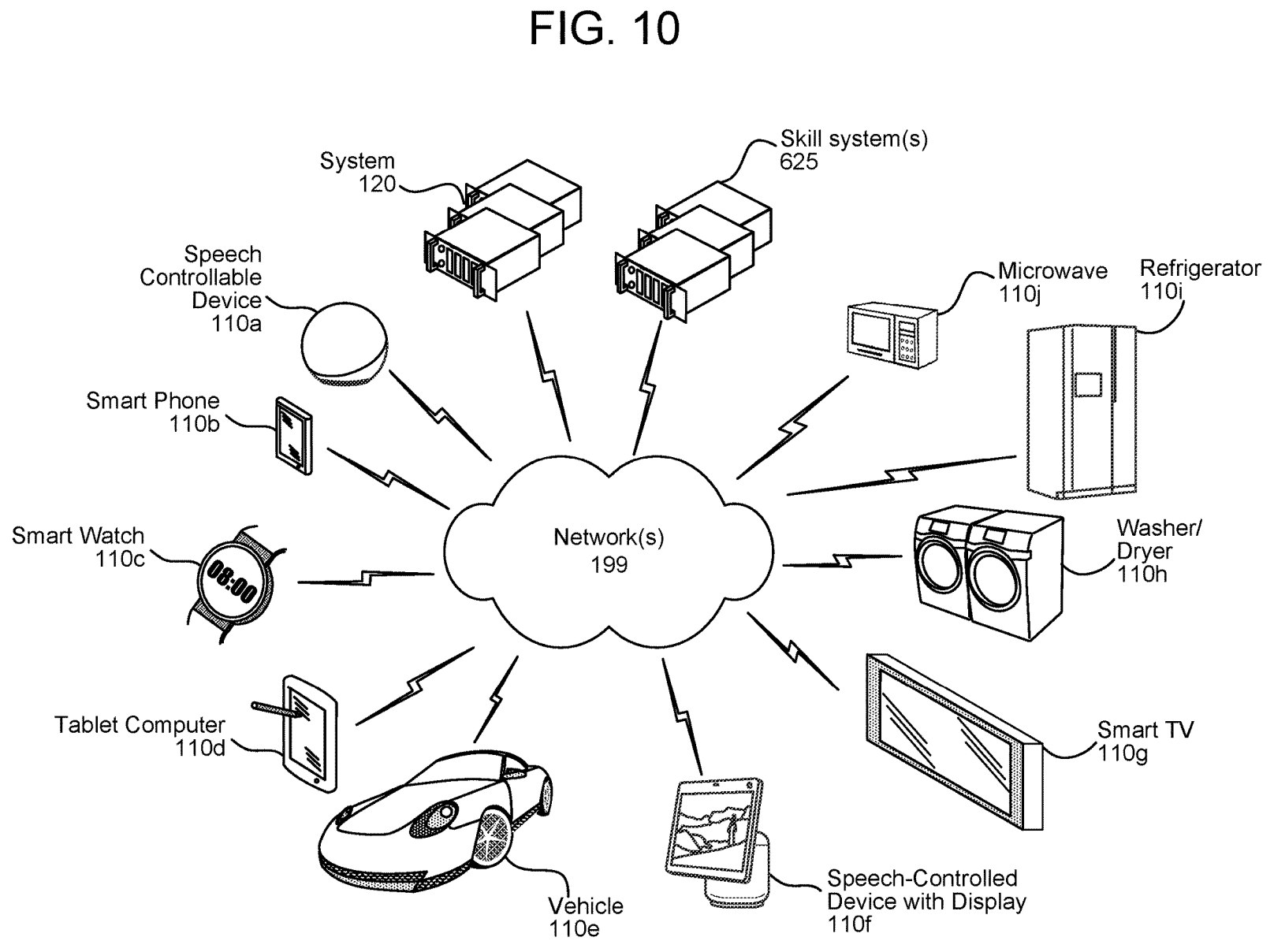

Refrigerator 110i

Washer/ Dryer 110h

Smart TV 110g

Microwave 110j

Speech-Controlled Device with Display 110f

Skill system(s) 625

System 120

Vehicle 110e

Speech Controllable Device 110a

Smart Phone 110b

Smart Watch 110c

Tablet Computer 110d

Network(s) 199

SYSTEMS AND METHODS FOR ON-DEVICE SPOKEN LANGUAGE UNDERSTANDING

BACKGROUND

Spoken language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1C are conceptual diagrams illustrating an example device for performing spoken language understanding (SLU) processing based on classifying a spoken input, according to embodiments of the present disclosure.

FIG. 5 is a conceptual diagram illustrating an example of how entity context data may be generated, according to embodiments of the present disclosure.

FIG. 8 is a block diagram conceptually illustrating example components of a device, according to embodiments of the present disclosure.

FIG. 10 illustrates an example of a computer network for use with the overall system, according to embodiments of the present disclosure.

DETAILED DESCRIPTION

Figure 2:
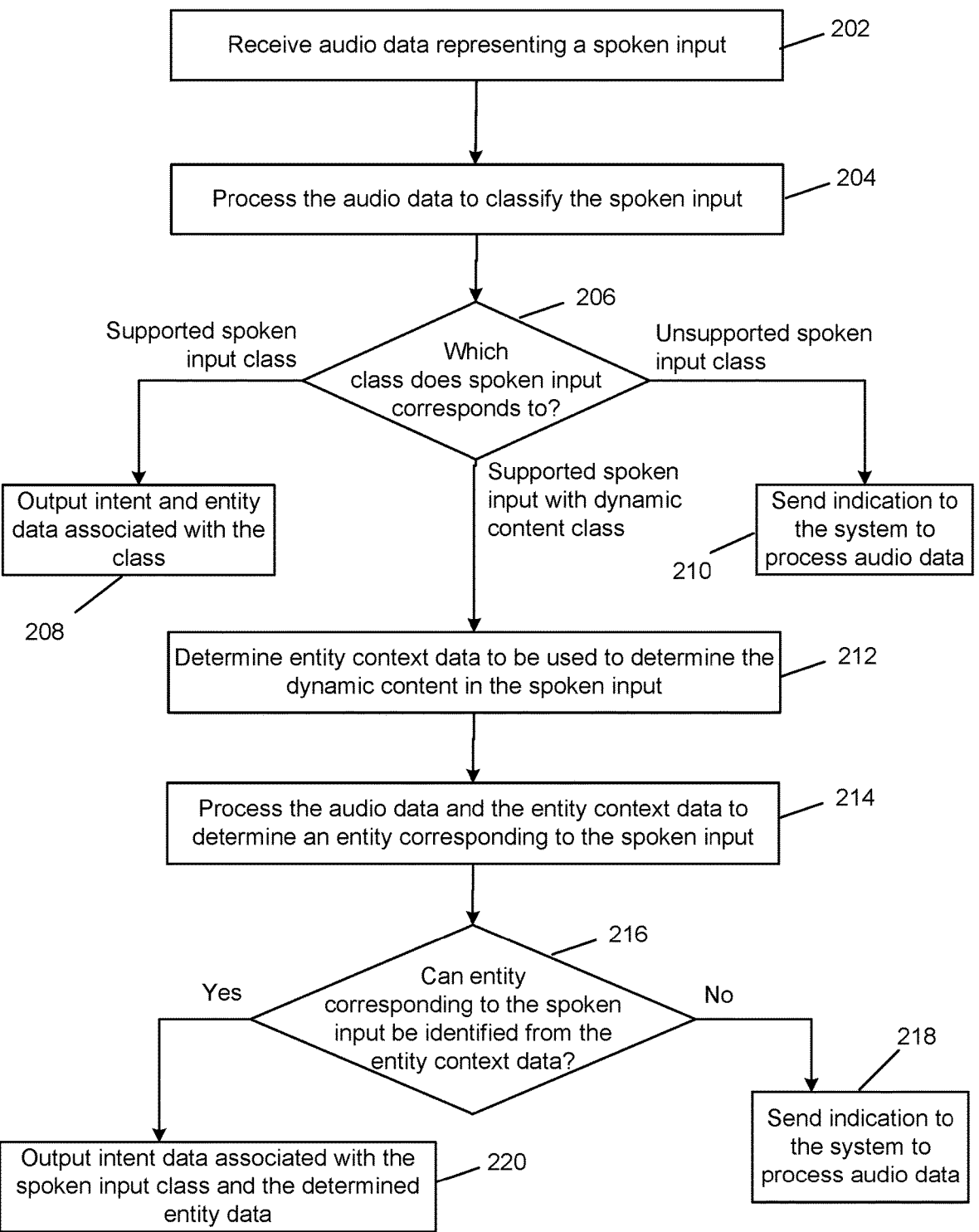
FIG. 2 is a flowchart illustrating a process that may be performed by a SLU component, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU can be used together as part of a speech processing system. Spoken language understanding (SLU) may involve determining meaning (e.g., intent, entities, etc.) directly from audio including speech. Text-to-speech (TTS) is a field of concerning transforming textual data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

Performing SLU processing on-device (e.g., a smart speaker, a smartphone, a smart TV, etc.) can offer latency savings, backend system cost savings, and enhance user's feeling of privacy compared to performing SLU processing in the cloud, as the audio data does not always need to be transmitted from the device to a remote server. Some approaches for SLU processing on-device involve use of a fully neural architecture. However, many of these approaches still require additional, secondary techniques to achieve low-latency speech recognition, audio event detection, computer vision, image processing, content rendering, etc., such as model compression, replacement of certain components, etc.

The present disclosure relates to improved techniques for performing SLU processing on-device. The improved techniques take advantage of spoken inputs that are frequently received by a device, referred to herein as "supported spoken inputs," and determines intent and entity data corresponding to such supported spoken inputs from stored data. Moreover, the techniques also handle supported spoken inputs with dynamic content, where a portion of the spoken input corresponds to a frequently received spoken input and another portion corresponds to an entity that may not be frequently received. For example, a supported spoken input may be "Play", "Turn volume down", and the like. An example of a supported spoken input with dynamic content may be "Play <movie title>," where <movie title> may be the dynamic content. When a supported spoken input with dynamic content is received, the dynamic content is determined using context information relating to the spoken input. For example, the <movie title> may be determined based on which movie titles are displayed on the device (or by a display associated with the device) when the spoken input is received. When a spoken input is not a supported spoken input, or is a supported spoken input with dynamic content that the device is unable to determine using context information, referred to herein as "unsupported spoken inputs", then the device can send the audio data to a system for processing.

Embodiments of the present disclosure involve use of a machine learning (ML) model, such as, a classifier, to determine whether audio data, representing a spoken input, belongs to a supported spoken input class, a supported spoken input class with dynamic content, or an unsupported class. When the audio data belongs to a supported spoken input class, the device can determine corresponding intent and entity data using stored data. When the audio data belongs to a supported spoken input with dynamic content class, the device can determine the dynamic content using context information, and then determine intent and entity data accordingly.

The techniques described herein result in latency savings in processing and responding to a spoken input. Moreover, the techniques described herein reduce the computing resources needed to perform SLU processing on-device.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

Figure 1A:
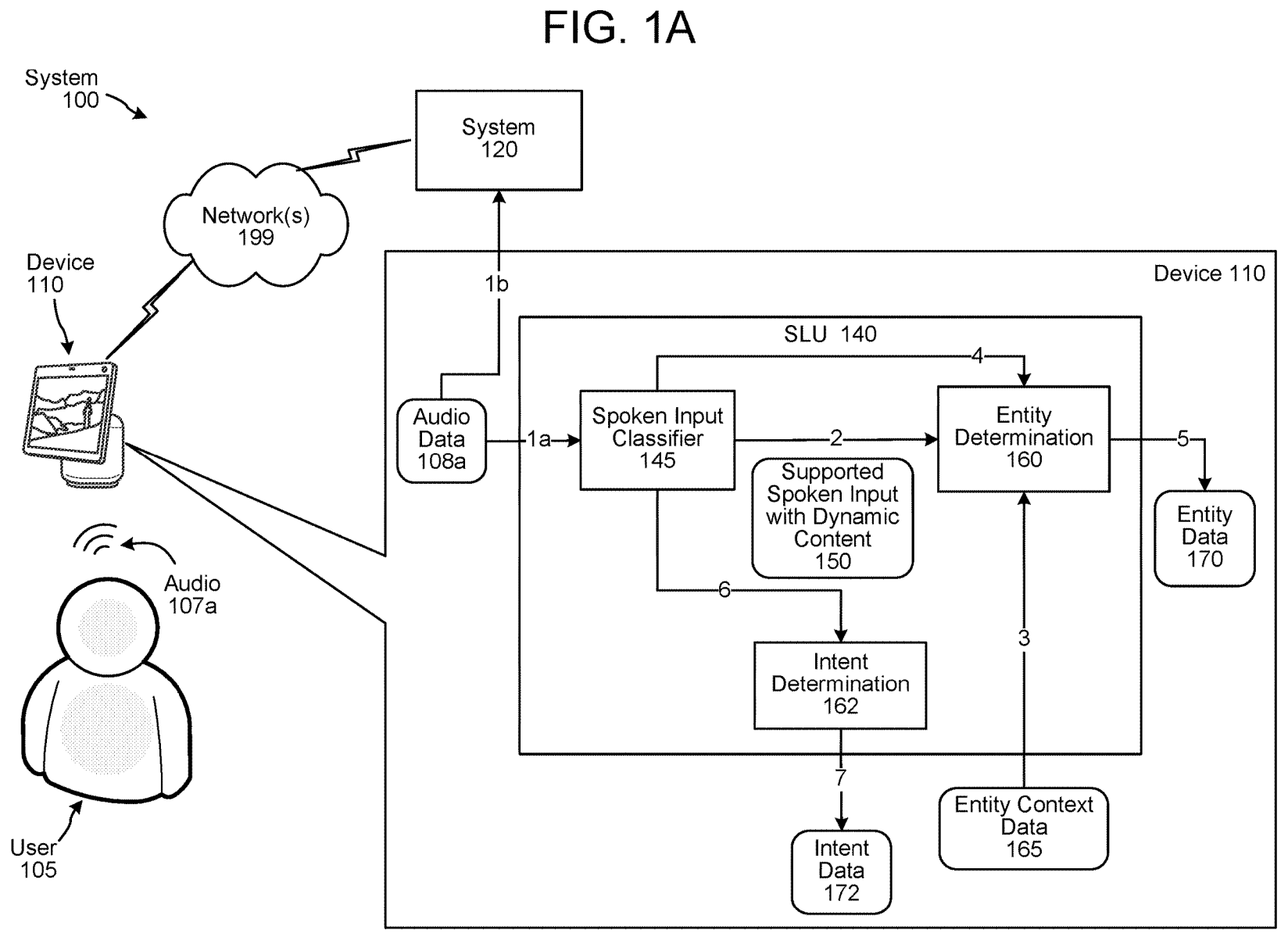
Figure 1B:
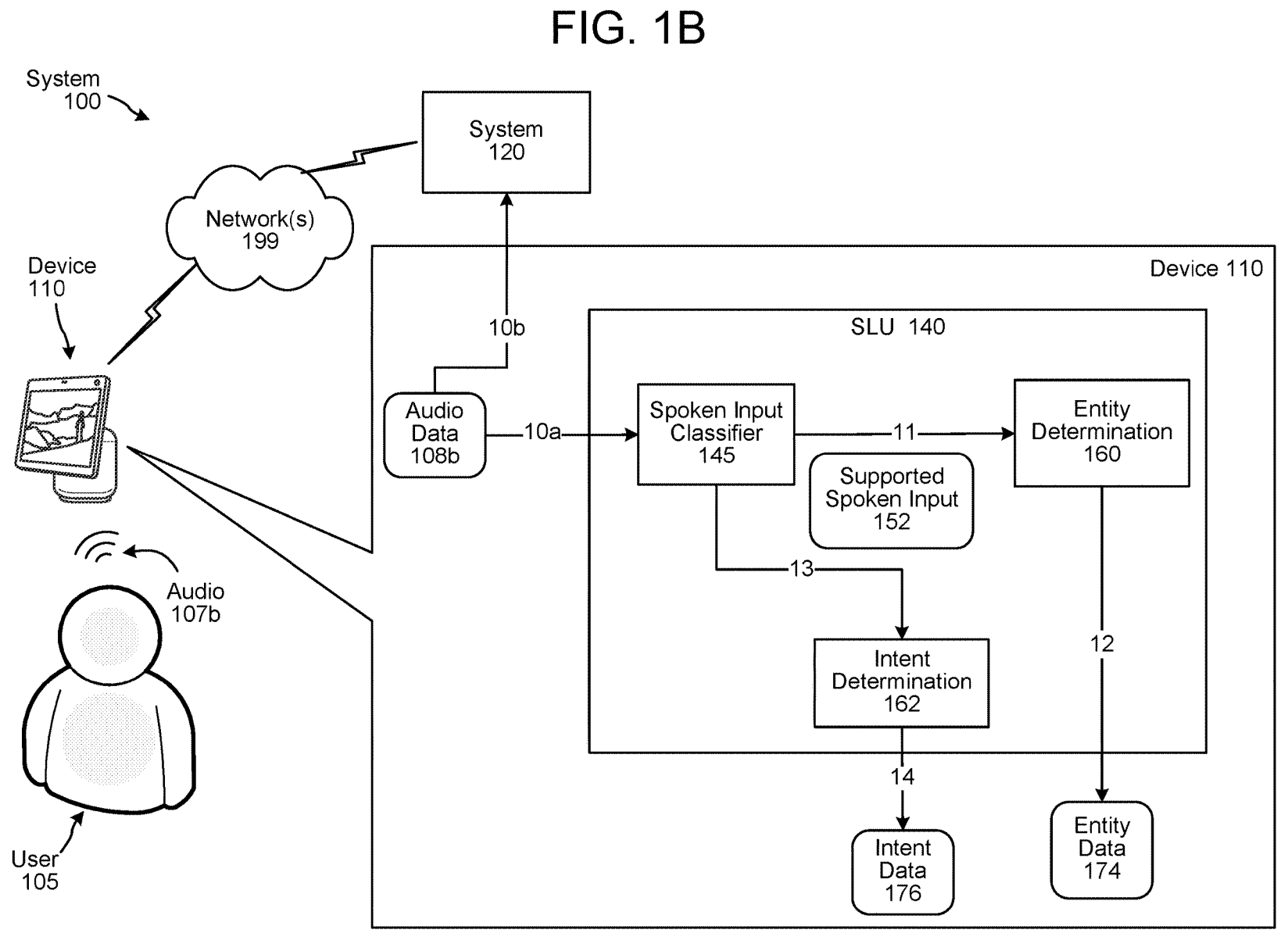

FIGS. 1A-1C are conceptual diagrams illustrating how an example device can perform SLU processing based on classifying a spoken input, according to embodiments of the present disclosure. As shown in FIGS. 1A-1C, the system 100 may include a device 110, local to a user 105, connected to a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be configured as a speech processing system, an example of which is described below in relation to FIG. 6. The device 110 may be configured to perform speech processing as well. FIGS. 1A-1C show the device 110 including an SLU component 140. Other example components that may be included in the device 110 for speech processing are described below in relation to FIG. 7.

In some embodiments, the SLU component 140 may include a spoken input classifier 145, an entity determination component 160, and an intent determination component 162. The SLU component 140 can process audio data, representing a spoken input, to determine an intent and one or more entities corresponding to the spoken input. The SLU component 140 may be configured to classify audio data to one of the following classes: (1) supported spoken input class; (2) supported spoken input with dynamic content class; or (3) unsupported spoken input class. A spoken input corresponding to the supported spoken input class may correspond to a known intent and a known entity that can be determined using stored data. A spoken input corresponding to the supported spoken input class may correspond to a known intent (that can be determined using stored data) and an unknown entity that can be determined using context information. A spoken input corresponding to the unsupported spoken input class may correspond to an unknown intent and an unknown entity that can be determined by performing further processing on the audio data.

Depending on which class the audio data belongs to, the SLU component 140 may perform further processing accordingly to determine intent data and entity data corresponding to the spoken input. The specific processing performed based on the spoken input class is described below in relation to FIGS. 1A-1C.

FIG. 1A shows the processing that may be performed by the SLU component 140 when the spoken input corresponds to a supported spoken input with dynamic content class. Referring to FIG. 1A, the user 105 may speak an input, and the device 110 may capture audio 107a representing the spoken input. For example, the user 105 may say "Play <movie title>" or "Play <song name>." The device 110 may determine audio data 108a corresponding to the audio 107a. Details on how the audio data 108a may be determined are described below in relation to FIGS. 6 and 7. The device 110 may send (step 1a) the audio data 108a to the SLU component 140, in particular to the spoken input classifier component 145, for processing.

The device 110 may also send (step 1b) the audio data 108a to the system 120 at substantially the same time as sending the audio data 108a to the SLU component 140. In some embodiments, the system 120 may process the audio data 108a in parallel to the SLU component 140 processing the audio data 108a at the device 110. The processing performed by the system 120 is described in detail below in relation to FIG. 6. The system 120 may process the audio data 108a to determine ASR data, NLU data, and other data corresponding to the spoken input. In the case that the SLU component 140 is unable to determine NLU data corresponding to the audio data 108a, the system 120 may use the data determined by the system 120 to generate output data responsive to the spoken input.

The spoken input classifier component 145 may be configured to process the audio data 108a to determine whether the audio data 108a belongs to a supported spoken input, a supported spoken input with dynamic content, or an unsupported spoken input. Details on how the spoken input classifier component 145 may make this determination are described below in relation to FIGS. 3 and 4. In this case, continuing with the example spoken input being "Play <movie title>" or "Play <song name>", the spoken input classifier component 145 may determine that the audio data 108a corresponds to the supported spoken input with dynamic content class "Play <movie title>", or the supported spoken input with dynamic content class "Play <song name>". In response to this determination, the spoken input classifier component 145 may output a supported spoken input with dynamic content class indicator 150 corresponding to the determined supported spoken input with dynamic content class.

In some embodiments, the spoken input classifier component 145 may send (step 2) the supported spoken input with dynamic content class indicator 150 to the entity determination component 160. The entity determination component 160 may be configured to determine entity data representing one or more entities represented in the spoken input. In some cases, the entity determination component 160 may use the class indicator outputted by the spoken input classifier component 145 to determine the entity data. In some cases, the entity determination component 160 may also use the audio data 108a to determine the entity data. In some embodiments, the entity data may also associate each entity with a corresponding entity type.

In some embodiments, when the spoken input classifier component 145 outputs the supported spoken input with dynamic content class indicator 150, the entity determination component 160 also uses entity context data 165 to determine entity data. The entity context data 165 may correspond to multiple entities, which may be derived from contextual information related to capturing of the audio 107a. For example, the entity context data 165 may correspond to one or more movie titles that may be displayed at the device 110 (or using a display associated therewith) when the audio 107a is captured. As another example, the entity context data 165 may correspond to one or more song names that may be displayed at the device 110 (or using a display associated therewith) when the audio 107a is captured. As a further example, the entity context data 165 may correspond to one or more entities derived from user profile data associated with a user identifier for the user 105. Details on how the entity context data 165 may be determined are described below in relation to FIG. 5.

The entity determination component 160 may receive (step 3) the entity context data 165. The entity determination component 160 may also receive (step 4) the audio data 108*a*. Using the audio data 108*a* and/or the entity context data 165, the entity determination component 160 may determine and output (step 5) entity data 170 corresponding to the spoken input. The entity data 170 may represent one or more entities included in the spoken input and represented in the audio data 108*a*. The one or more entities in the entity data 170 may be one or more entities corresponding to the entity context data 165. For example, the entity context data 165 may correspond to a first movie title, a second movie title, a third movie title and a fourth movie title, which may be displayed at the device 110 (or using a display associated therewith). For the spoken input "Play <movie title>", the entity determination component 160 may determine the entity data 170 to be the second movie title, thus determining that the user 105 said "Play second movie title." As another example, the entity context data 165 may correspond to a first song name, a second song name, a third song name and a fourth song name, which may be displayed at the device 110 (or using a display associated therewith). For the spoken input "Play <song name >", the entity determination component 160 may determine the entity data 170 to be the first song name, thus determining that the user 105 said "Play first song name." Details on how the entity determination component 160 may determine the entity data 170 are described below in relation to FIGS. 3 and 4.

In some embodiments, the spoken input classifier component 145 may send (step 6) the supported spoken input with dynamic content class indicator 150 to the intent determination component 162. In some embodiments, the spoken input classifier component 145 may perform steps 2 and 6 at least partially in parallel. That is, the spoken input classifier component 145 may send the supported spoken input with dynamic content class indicator 150 to the entity determination component 160 and the intent determination component 162 at substantially the same time, resulting in the entity determination component 160 and the intent determination component 162 processing at least partially in parallel.

The intent determination component 162 may be configured to determine and output (step 7) intent data corresponding to the spoken input. In some embodiments, the intent determination component 162 may be configured to determine the intent data based on the class indicator outputted by the spoken input classifier component 145. The intent determination component 162 may store respective intent data associated with respective spoken input classes. For example, the intent determination component 162 may store first intent data (e.g., PlayIntent) associated with a first supported spoken input class (e.g., "Play"), second intent data (e.g., VolumeUpIntent) associated with a second supported spoken input class (e.g., "Turn up the volume"), third intent data (e.g., PlayMovieIntent) associated with a first supported spoken input with dynamic content class (e.g., "Play <movie title>", fourth intent data (e.g., PlaySongIntent) associated with a second supported spoken input with dynamic content class (e.g., "Play <song name>"), etc. Based on the stored data and the supported spoken input with dynamic content indicator class 150, the intent determination component 162 may determine intent data 172 corresponding to the spoken input.

Figure 7:
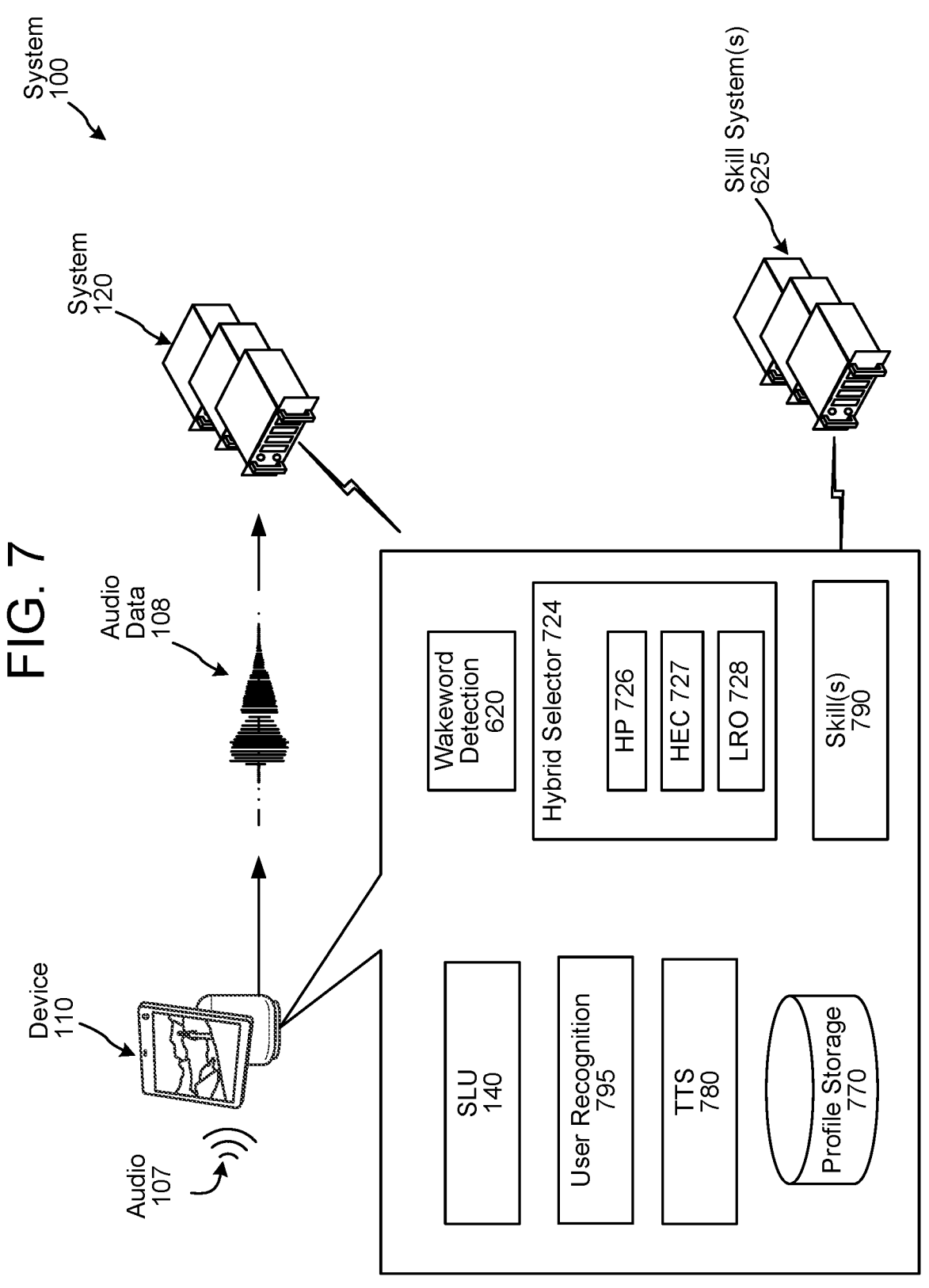
FIG. 7 is a conceptual diagram illustrating components that may be included in a device, according to embodiments of the present disclosure.

The entity data 170 and the intent data 172 may be used by other components of the device 110, such as, a skill component 790 as described below in relation to FIG. 7, to determine output data responsive to the spoken input. In other embodiments, the intent data 172 and the entity data 170 may be provided to the system 120 for further processing and for determining output data responsive to the spoken input.

FIG. 1B shows the processing that may be performed by the SLU component 140 when the spoken input corresponds to a supported spoken input class. Referring to FIG. 1B, the user 105 may speak an input, and the device 110 may capture audio 107*b* representing the spoken input. For example, the user 105 may say "Play," "Turn up the volume" or "Rewind." The device 110 may determine audio data 108*b* corresponding to the audio 107*b*. Details on how the audio data 108*b* may be determined are described below in relation to FIGS. 6 and 7. The device 110 may send (step 10a) the audio data 108*b* to the spoken input classifier component 145 for processing.

The device 110 may also send (step 10b) the audio data 108*b* to the system 120 at substantially the same time as sending the audio data 108*b* to the SLU component 140. In some embodiments, the system 120 may process the audio data 108*b* in parallel to the SLU component 140 processing the audio data 108*b* at the device 110. The processing performed by the system 120 is described in detail below in relation to FIG. 6. The system 120 may process the audio data 108*b* to determine ASR data, NLU data, and other data corresponding to the spoken input. In the case that the SLU component 140 is unable to determine NLU data corresponding to the audio data 108*b*, the system 120 may use the data determined by the system 120 to generate output data responsive to the spoken input.

The spoken input classifier component 145 may process the audio data 108*b* to determine whether the audio data 108*b* belongs to a supported spoken input class, a supported spoken input with dynamic content class, or an unsupported spoken input class. Details on how the spoken input classifier component 145 may make this determination are described below in relation to FIGS. 3 and 4. In this case, continuing with the example spoken input being "Play", "Turn up the volume" or "Rewind", the spoken input classifier component 145 may determine that the audio data 108*b* corresponds to a supported spoken input class. In response to this determination, the spoken input classifier component 145 may output a supported spoken input class indicator 152.

In some embodiments, the spoken input classifier component 145 may send (step 11) the supported spoken input class indicator 152 to the entity determination component 160. In some cases, the entity determination component 160 may store respective entity data associated with respective supported spoken input classes. For example, the entity determination component 160 may store first entity data (e.g., "up") associated with a first supported spoken input class (e.g., "Turn up the volume"). In some cases, a spoken input may not include an entity. For example, the spoken input "Play" or "Rewind" does not include an entity. In such cases, the entity determination component 160 may store data indicating that no entity (e.g., null, not applicable indicator, or the like) is associated with a second supported spoken input class (e.g., "Play") and that no entity is associated with a third supported spoken input class (e.g. "Rewind"). Using the stored data and the supported spoken input class indicator 152, the entity determination component 160 may determine and output (step 12) entity data 174 corresponding to the spoken input represented in the audio 107*b*. The entity data 174 may be stored entity data or may be null depending the supported spoken input class indicator 152.

In some embodiments, the spoken input classifier component 145 may send (step 13) the supported spoken input class indicator 152 to the intent determination component 162. In some embodiments, the spoken input classifier component 145 may perform steps 11 and 13 at least partially in parallel. That is, the spoken input classifier component 145 may send the supported spoken input class indicator 152 to the entity determination component 160 and the intent determination component 162 at substantially the same time, resulting in the entity determination component 160 and the intent determination component 162 processing at least partially in parallel.

A further example (to ones described above in relation to FIG. 1A) of data stored at the intent determination component 162 is fifth intent data (e.g., RewindIntent) associated with a third supported spoken input class (e.g., "Rewind"). Based on the stored data and the supported spoken input indicator 152, the intent determination component 162 may determine and output (step 14) intent data 176 corresponding to the spoken input represented in the audio 107*b*.

The entity data 174 and the intent data 176 may be used by other components of the device 110, such as, a skill component 790 as described below in relation to FIG. 7, to determine output data responsive to the spoken input. In other embodiments, the intent data 176 and the entity data 174 may be provided to the system 120 for further processing and for determining output data responsive to the spoken input.

FIG. 1C shows the processing that may be performed by the SLU component 140 when the spoken input corresponds to an unsupported spoken input class. Referring to FIG. 1C, the user 105 may speak an input, and the device 110 may capture audio 107*c* representing the spoken input. For example, the user 105 may say "Download <new application>." The device 110 may determine audio data 108*c* corresponding to the audio 107*c*. Details on how the audio data 108*c* may be determined are described below in relation to FIGS. 6 and 7. The device 110 may send (step 16a) the audio data 108*c* to the spoken input classifier component 145 for processing.

The device 110 may also send (step 16b) the audio data 108*c* to the system 120 at substantially the same time as sending the audio data 108*c* to the SLU component 140. In some embodiments, the system 120 may process the audio data 108*c* in parallel to the SLU component 140 processing the audio data 108*c* at the device 110. The processing performed by the system 120 is described in detail below in relation to FIG. 6. The system 120 may process the audio data 108*c* to determine ASR data, NLU data, and other data corresponding to the spoken input. In the case that the SLU component 140 is unable to determine NLU data corresponding to the audio data 108*c*, the system 120 may use the data determined by the system 120 to generate output data responsive to the spoken input.

The spoken input classifier component 145 may process the audio data 108*c* to determine whether the audio data 108*c* belongs to a supported spoken input class, a supported spoken input with dynamic content class, or an unsupported spoken input class. Details on how the spoken input classifier component 145 may make this determination are described below in relation to FIGS. 3 and 4. In this case, continuing with the example spoken input being "Download <new application>", the spoken input classifier component 145 may determine that the audio data 108*c* corresponds to an unsupported spoken input class. In response to this determination, the spoken input classifier component 145 may output (step 17) an unsupported spoken input class indicator 154.

In response to the spoken input classifier component 145 outputting the unsupported spoken input class indicator 154, the device 110 may send (step 18) an indication (e.g., signal, command, or other type of data) to process audio data 180 to the system 120. In response to receiving the indication 180, the system 120 may determine intent data and entity data (or use already determined intent data and entity data based on receiving the audio data 108*c* in step 16b) corresponding to the spoken input by processing the audio data 108*c* as described below in relation to FIG. 6.

As described herein, the SLU component 140 may be configured to support (i.e. output intent data and entity data for) a limited set of spoken inputs which allows for building a small/low-footprint, fast model for SLU processing, which may be suitable for on-device SLU processing.

In some embodiments, the SLU component 140 may use other types of data to determine intent and entity data corresponding to the spoken input. An example of the other types of data includes image data captured by a camera(s) of the device 110. The image data may capture a gesture performed by the user 105, a facial expression/sentiment expressed by the user 105, objects within the user's environment, etc. The device 110 or the system 120 may process the image data to determine one or more data corresponding to the spoken input. For example, the device 110/the system 120 may determine, using the image data, that the user 105 is pointing to a TV while providing the spoken input. Data indicative of the user's gesture may be provided to the SLU component 140, which in turn may determine that the user's intent relates to viewing/playing a video rather than listening to/playing an audio. As a further example, information derived from the image data may be used to determine the entity context data 165. Other examples of the other types of data used by the SLU component 140 include location data, time/day data, sentiment data (determined from the audio data 108), etc.

FIG. 2 is a flowchart illustrating a process that may be performed by the SLU component 140, according to embodiments of the present disclosure. At a step 202, the SLU component 140 may receive the audio data 108 representing a spoken input. At a step 204, the SLU component 140 may process (as described below in relation to FIGS. 3-4) the audio data 108 to classify the spoken input.

The SLU component 140 may be configured to classify the spoken input to one of multiple supported spoken input classes, one of multiple supported spoken input with dynamic content classes, or an unsupported class. The supported spoken input classes may correspond to frequently-received spoken inputs. For example, a first supported spoken input class may correspond to the spoken input "Play", a second supported spoken input class may correspond to the spoken input "Turn up the volume", a third supported spoken input class may correspond to the spoken input "Rewind," etc. Thus, each supported spoken input class may correspond to a different spoken input, and the SLU component 140 may be configured to classify to one of multiple supported spoken input classes.

The supported spoken input with dynamic content classes may correspond to frequently-received spoken inputs with dynamic/different content (e.g., entities). In some cases, the dynamic content may be based on what is displayed at the device 110 (or using a display associated therewith), user preferences, and/or user profile data, etc. An example first supported spoken input with dynamic content class may correspond to the spoken input "Play <movie title>; an example second supported spoken input with dynamic content class may correspond to the spoken input "Play <song name>," etc. Thus, each supported spoken input with dynamic content class may correspond to a different spoken input, and the SLU component 140 may be configured to classify to one of multiple supported spoken input with dynamic content classes.

The SLU component 140 may classify the spoken input to the unsupported spoken input class when the audio data 108 does not correspond to one of the supported spoken input classes (frequently spoken inputs) or one of the supported spoken input with dynamic content classes (frequently spoken inputs with dynamic content).

At a decision step 206, the SLU component 140 determines which class the spoken input corresponds to. If the spoken input corresponds to a supported spoken input class, then the SLU component 140 may determine and output intent and entity data associated with the class, and the SLU component 140 (at step 208) may output the intent and entity data to determine output data responsive to the spoken input. The SLU component 140 may store intent data and entity data associated with each of the supported spoken input class. For example, the SLU component 140 may store {PlayIntent} and {null entity} associated with a supported spoken input class for the spoken input "Play." As another example, the SLU component 140 may store {VolumeIntent} and {"turn up"} associated with a supported spoken input class for the spoken input "Turn up the volume." The stored intent and entity data, associated with the class corresponding to the spoken input, may be used to determine output data responsive to the spoken input.

At the decision step 206, if the spoken input corresponds to an unsupported spoken input class, then at a step 210, the device 110 may send an indication to the system 120 to process the audio data 108. In response to receiving the indication, the system 120 may determine intent data and entity data corresponding to the spoken input by processing the audio data 108.

At the decision step 206, if the spoken input corresponds to a supported spoken input with dynamic content class, then at a step 212, the SLU component 140 may determine the entity context data 165 to be used to determine the dynamic content in the spoken input. In some embodiments, the entity context data 165 may correspond to one or more entities that are displayed at the device 110 (or using a display associated therewith). For example, the device 110 (or associated display) may display one or more visual media titles (e.g., movies, TV shows, videos, etc.) corresponding to visual media that can be viewed by the user 105. As another example, the device 110 (or associated display) may display one or more audio media titles (e.g., music, albums, podcasts, radio stations, etc.) corresponding to audio media that can be heard by the user 105 via the device 110. As yet another example, the device 110 may display information pertaining to one or more skills/applications that the user 105 can access via the device 110. As such, the entity context data 165 may correspond to one or more media titles, one or more audio titles, and/or one or more skills/applications, etc. Such entities, which are displayed at the device 110 (or using a display associated therewith), may be referred to as device context data.

In some embodiments, the entity context data 165 may correspond to one or more entities derived from user profile data associated with the user 105 and stored in a profile storage 670/770. For example, the user profile data may include one or more contact names that the user 105 can communicate with (e.g., voice call, video call, send a message, etc.) via the device 110. As another example, the user profile data may include one or more device names (e.g., smart home appliances, smart TV, lights, etc.) that the user 105 can operate via the device 110. As yet another example, the user profile data may include a media catalog (e.g., movies, songs, podcasts, etc.) that may be purchased, downloaded, or otherwise added by the user 105. As yet another example, the user profile data may include one or more user preferences (e.g., preferred devices, preferred skills, preferred locations, etc.). As such, the entity context data 165 may correspond to one or more contact names, one or more device names, one or more media catalog items, and/or one or more user preferences, etc.

In some embodiments, the SLU component 140 may determine which entities to include in the entity context data 165 based on the class corresponding to the spoken input. For example, if the spoken input corresponds to a first supported spoken input with dynamic content class for "Play <movie title>", then the entity context data 165 may correspond to movies titles displayed at the device 110 (or using a display associated therewith) and/or movie titles included in a media catalog of the user profile data. As another example, if the spoken input corresponds to a second supported spoken input with dynamic content class for "Play <song name>", then the entity context data 165 may correspond to song names displayed at the device 110 (or using a display associated therewith) and/or song names included in a media catalog of the user profile data. In yet another example, if the spoken input corresponds to a third supported spoken input with dynamic content class for "Turn on <device name >", then the entity context data 165 may correspond to device names from the user profile data. As yet another example, if the spoken input corresponds to a fourth supported spoken input with dynamic content class for "Navigate to <location>", then the entity context data 165 may include locations from the user profile data.

In some embodiments, the SLU component 140 may determine which entities to include in the entity context data 165 based on a domain corresponding to the spoken input. As used herein, a "domain" may refer to a collection of related functionality. A domain may be associated with one or more skills performing related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

In some cases, the user 105 may provide an input indicating a domain corresponding to the spoken input. For example, the user 105 may select (e.g., by saying "Start music skill", by selecting a graphical user interface element on the device 110, etc.) a music domain prior to providing the spoken input. In other cases, the device 110 may include a domain classification component to determine a domain corresponding to the spoken input. The domain classification component may process the audio data 108 and/or other information to determine a domain corresponding to the spoken input.

The entity context data 165 may be based on the domain corresponding to the spoken input. For example, if the spoken input corresponds to a music domain, then the entity context data 165 may correspond to song names displayed at the device 110 (or using a display associated therewith) and/or song names included in a media catalog of the user profile data. As another example, if the spoken input corresponds to a smart home domain, then the entity context data 165 may correspond to device names from the user profile data.

The SLU component 140 may use other context information corresponding to the spoken input and/or the device 110, to determine the entity context data 165. Such context information may include location of the device 110, time/day the spoken input is received, device type for the device 110, device capabilities, etc. For example, if the device 110 is a smart TV or has a display screen, then the entity context data 165 may correspond to entities displayed at the device 110. As another example, if the device 110 is in a vehicle, then the entity context data 165 may correspond to locations included in the user profile data, audio media titles included in the user profile data, etc.

At a step 214, the SLU component 140 may process the audio data 108 and the entity context data 165 to determine at least one entity represented in the spoken input. Details on how the SLU component 140 may make this determination are described below in relation to FIGS. 3 and 4. The SLU component 140 may process audio embedding data corresponding to the audio data 108 and entity embedding data corresponding to the entity context data 165 to determine which one or more entities, represented in the entity context data 165, correspond to the one or more entities represented in the audio data 108.

In some cases, an entity, represented in the audio data 108, may not be represented in the entity context data 165. At a decision step 216, the SLU component 140 determines whether an entity corresponding to the spoken input can be identified from the entity context data 165. If the entity corresponding to the spoken input cannot be identified from the entity context data 165, then, at a step 218, the SLU component 140 may send an indication to the system 120 to process the audio data 108. In response to receiving the indication, the system 120 may process the audio data 108 to determine intent data and entity data corresponding to the spoken input.

If all entities corresponding to the spoken input can be identified from the entity context data 165, then at a step 220, the SLU component 140 may output the intent data associated with the spoken input class and the determined entity data. The SLU component 140 may store intent data associated with each of the supported spoken input with dynamic content classes. For example, the SLU component 140 may store {PlayIntent} associated with a first supported spoken input with dynamic content class for the spoken input "Play <movie title>." As another example, the SLU component 140 may store {TurnOnIntent} associated with a second supported spoken input with dynamic content class for the spoken input "Turn on <device name>." The determined entity data is the entity data determined in the step 214. The stored intent data and the determined entity data may be used, by the device 110, to determine output data responsive to the spoken input.

Figure 3:
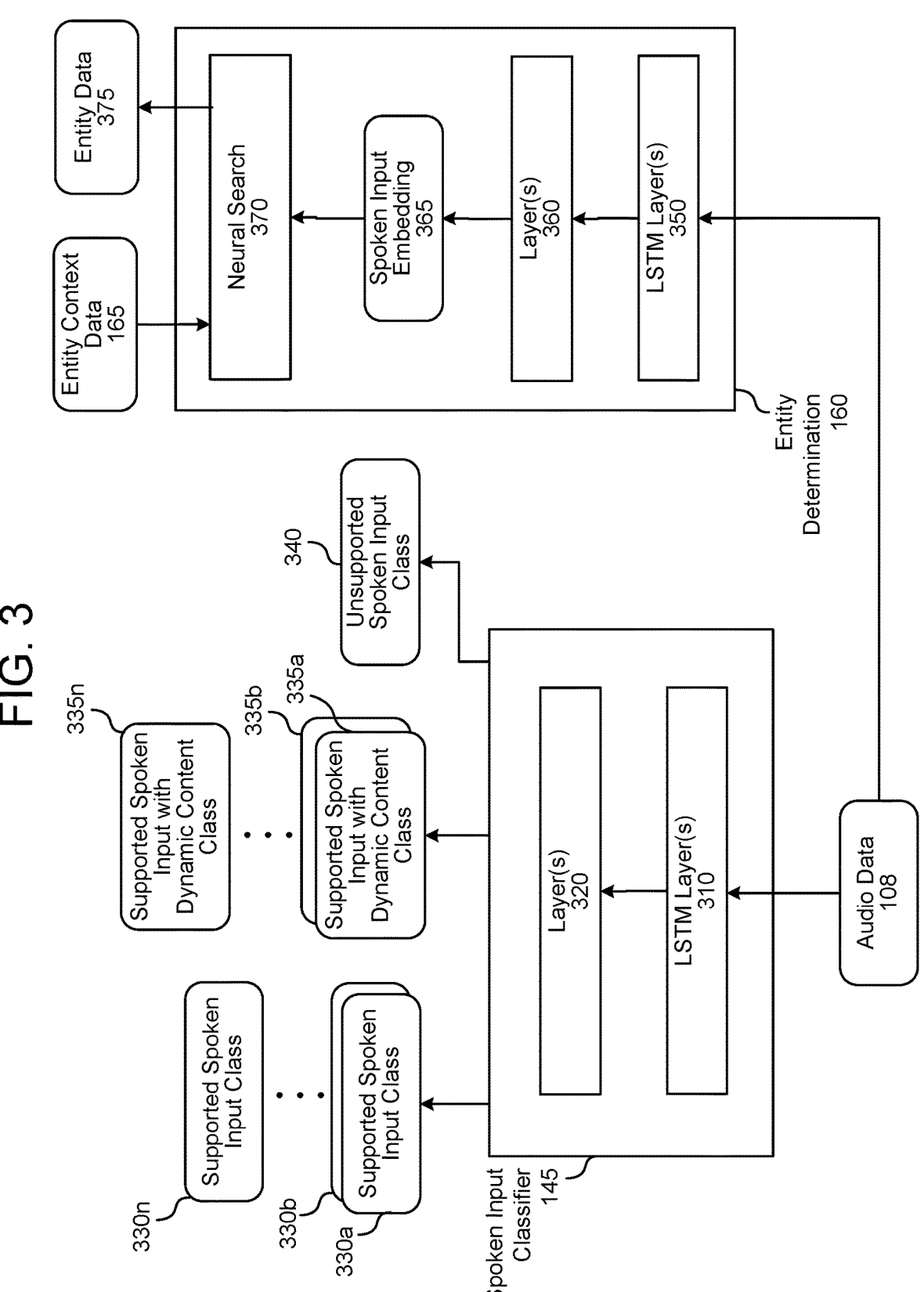
FIG. 3 is a conceptual diagram illustrating example components of the SLU component, according to an example embodiment of the present disclosure.

FIG. 3 is a conceptual diagram illustrating example components of the SLU component 140, according to an example embodiment of the present disclosure.

Some embodiments of the SLU component 140 include two ML models, one implemented at the spoken input classifier 145 and the other implemented at the entity determination component 160. In some embodiments, one or both of the ML models may be a neural network model. As described above, the ML model of the spoken input classifier 145 may be configured to classify the spoken input into a supported spoken input class 330, a supported spoken input with dynamic content class 335 or an unsupported spoken input class 340. The ML model of the entity determination component 160 may be configured to handle the dynamic content of a spoken input, such as video names, that appear on a device screen. In some embodiments, the two ML models for the spoken input classifier 145 and the entity determination component 160 are trained independently.

In some embodiments, the audio data 108 may be log-filter bank energies (LFBE) data determined from the audio 107. The LFBE data may be determined by performing a windowing function on the audio 107. In an example embodiment, the audio 107 may be segmented using a window of 25 ms and a frame rate of 10 ms. A left context of three frames may be used, resulting in 192-dimensional input features, with a skip rate of 3 frames. These features may be normalized using a global mean and variance and then used as the audio data 108.

The spoken input classifier 145 may employ a neural classification model that classifies the audio data 108 into a predefined set of classes (e.g., 330, 335 and 340). The output of the neural classification model may be a vector of M+N+1, where M is the number of supported spoken input classes 330a-330n, N is the number of supported spoken input with dynamic content classes 335a-335n, and "1" is for the unsupported spoken input class 340. A value, included in the vector, may correspond to a probability score of the audio data 108 corresponding to the respective class.

The spoken input classifier 145 may include one or more LSTM layers 310. In an example embodiment, the LSTM layer(s) 310 may be a recurrent encoder with three unidirectional LSTMs of 128 units. The spoken input classifier 145 may also include, following the LSTM layer(s) 310, one or more layers 320. In an example embodiment, the layer(s) 320 may be two feed-forward layers of 256 units with tanh activations, and a final feed-forward layer of M+N+1 units with a softmax activation.

For training the spoken input classifier 145, a training dataset including audio data representing multiple different spoken inputs may be used. The training dataset may include audio for multiple spoken inputs that are examples of the supported spoken input classes 330, audio for multiple spoken inputs that are examples of the supported spoken input with dynamic content classes 335, and audio for multiple spoken inputs that are examples of the unsupported spoken input class 340. The training dataset may be labeled with the corresponding class. Training operations may use an optimizer technique with a cross-entropy loss. The learning rate may be set to $10^{-3}$ and an early stopping with 10 epochs patience may be used.

The ML model of the entity determination component 160 may include two parts: one that generates an audio embedding from the input audio data, and another that performs a search for the audio embedding among text embeddings of the entity context data 165. The audio embedding part may include one or more LSTM layers 350 followed by one or more layers 360. In an example embodiment, the LSTM layer(s) 350 may be a recurrent encoder with 3 unidirectional LSTMs with 256 units, and the layer(s) 360 may be a linear feed-forward layer with 256 units. The output of the layer(s) 360 may be spoken input embedding data 365 that corresponds to the entire spoken input.

The search part may be a neural metric learning approach employed by a neural search component 370. Since the spoken input is audio and the contextual entities are text (or other natural language representation), the neural search component 370 is configured to take inputs from different modalities (audio and text) and project them into a shared embedding space where audio-text embeddings that refer to the same entity are located close to one another.

The spoken input classifier 145 may classify the audio data 108 into one of the supported spoken input classes 330, one of the supported spoken input with dynamic content classes 335 or the unsupported spoken input class 340. Non-limiting examples of spoken inputs for the supported spoken input classes 330 are "Play", "Stop", "Rewind", "Forward", "Previous track", "Next track", "Volume up", "Volume down", "Switch TV input", "Open [application name]", "Sleep", etc. Each different spoken input may correspond to a different supported spoken input class. Non-limiting examples of spoken inputs for supported spoken input with dynamic content classes 335 are "Play <video name>", "Play <movie title>", "Play <song name>", etc. A spoken input with a different dynamic entity may be assigned a different class 335. Spoken inputs that are the same or have the same semantic meaning may be mapped to one of the classes 330a-330n, 335a-335n. Spoken inputs that cannot be mapped to one of the classes 330a-330n, 335a-335n, may be mapped to the unsupported spoken input class 340.

If the spoken input is classified to a supported spoken input class, then the supported spoken input class indicator 152 (shown in FIG. 1B) may be an indication of one of the supported spoken input classes 330a-330n. If the spoken input is classified to a supported spoken input with dynamic content class, then the supported spoken input with dynamic content class indicator 150 (shown in FIG. 1A) may be an indication of one of the supported spoken input with dynamic content classes 335a-335n. If the spoken input is classified to an unsupported spoken input class, then the unsupported spoken input class indicator 154 (shown in FIG. 1C) may be an indication of the unsupported spoken input class 340.

During training, spoken inputs with similar semantic meanings may be used as examples for a particular class. For example, first training audio representing the spoken input "Turn up the volume" and second training audio representing the spoken input "Volume up" may be labeled with the same first supported spoken input class 330a. In doing so, when the device 110 receives audio 107 representing "Turn up the volume" or "Volume up", the SLU component 140 can classify them to the same first supported spoken input class 330a.

In other embodiments, the spoken input classifier 145 may include a component (e.g., one or more layers) that are configured to determine a semantic meaning of the spoken input, and classifying the spoken input based on the semantic meaning. For example, the spoken input classifier 145 may determine that the audio 107 representing "Turn up the volume" is semantically similar to "Volume up" which is assigned to the first supported spoken input class 330a.

When the spoken input classifier 145 determines that one of the supported spoken input with dynamic content classes 335 corresponds to the audio data 108, the audio data 108 may be provided to the entity determination component 160. In some embodiments, the audio data 108 may be provided to the spoken input classifier 145 and the entity determination component 160 at the same time. That is, while the spoken input classifier 145 is processing, the entity determination component 160 may also be processing.

The entity determination component 160 may determine the spoken input embedding data 365 using the audio data 108. The neural search component 370 may be configured to determine a similarity between the spoken input embedding data 365 and the entity context data 165. As described below in relation to FIG. 5, the entity context data 165 may be text embedding data corresponding to one or more entities. In an example embodiment, the neural search component 370 may calculate a Euclidean distance between the audio embedding/spoken input embedding 365 and the text embeddings included in the entity context data 165. Since the embeddings are of unit length, the Euclidean distance may be a value in the range of [0; 2]. Other techniques for determining a similarity between the spoken input embedding 365 and the entity context data 165 may be used, for example, cosine similarity, a ML model configured to determine similarities between audio embeddings and text embeddings, statistical models, etc.

The neural search component 370 may use a threshold similarity value to determine if an entity corresponding to the entity context data 165 is represented in the spoken input embedding data 365. The neural search component 370 may output entity data 375 representing one or more entities that satisfy the threshold similarity value. For example, a first entity represented in the entity context data 165 may have a first similarity value with respect to the spoken input embedding data 365, and a second entity represented in the entity context data 165 may have a second similarity value with respect to the spoken input embedding data 365. The first and second similarity values may each satisfy the threshold value, and the entity data 375 may include data representing the first and second entities. In some embodiments, the neural search component 370 may output a ranked list of entities, where the ranking may be based on the similarity value between the spoken input embedding 365 and the entity context data 165.

If none of the entities corresponding to the entity context data 165 is similar, within the threshold similarity value to the spoken input embedding 365, then the spoken input may include an entity that is not represented in the entity context data 165. For example, the spoken input "Play [movie title]" may refer to a movie title that is not represented in the entity context data 165 (e.g., not displayed at the device 110, not included in the user profile data, etc.). In this case, the neural search component 370 may output a null, not available, or other similar indicator as the entity data 375. Based on the entity data 375 being null, the SLU component 140 may determine that the spoken input corresponds to an unsupported spoken input class, and may send the audio data 108 to the system 120 for processing.

In some embodiments, the SLU component 140 may determine a class corresponding to the spoken input based on the vector, including a probability score for each of the classes 330, 335, 340, outputted by the spoken input classifier 145. The SLU component 140 may first determine whether the probability score for the unsupported spoken input class 340 satisfies a condition, for example, the probability score is below a threshold value, and if the condition is satisfied, then the SLU component 140 may select the class associated with the highest probability score in the vector as the class corresponding to the spoken input. If the probability score for the unsupported spoken input class 340 does not satisfy the condition, for example, the probability score is above the threshold value, then the SLU component 140 may select the unsupported spoken input class 340 as corresponding to the spoken input.

The threshold value for determining the unsupported spoken input class 340 may be controlled to impact how many supported spoken inputs (e.g., corresponding to the classes 330 and 335) are sent to the system 120 for processing, in order to minimize false positives, such as unsupported spoken inputs which are wrongly predicted as supported spoken inputs. Such false positives may degrade the user experience because the device 110 may perform further processing with respect to the unsupported spoken input and provide an incorrect/undesired response to the user. However, when a supported spoken input is recognized as an unsupported spoken input, the device 110 will send the audio data 108 to the system 120 for processing, and the system 120 will provide a correct/desired response to the spoken input. A user may experience a higher latency but the spoken input will be handled by a system model trained using a more robust dataset.

In some embodiments, the SLU component 140 may output a N-best list of hypotheses corresponding to a spoken input. The N-best list of hypotheses may be based on a score/probability associated with each of the spoken input classes 330 and 335. For example, the N-best list of hypotheses may include intents corresponding to the top scoring classes 330, 335. The entity data 375 may represent more than one entity, and the N-best list of hypotheses may be based on a score/probability associated with each of the entities represented in the entity data 375.

Figure 4:
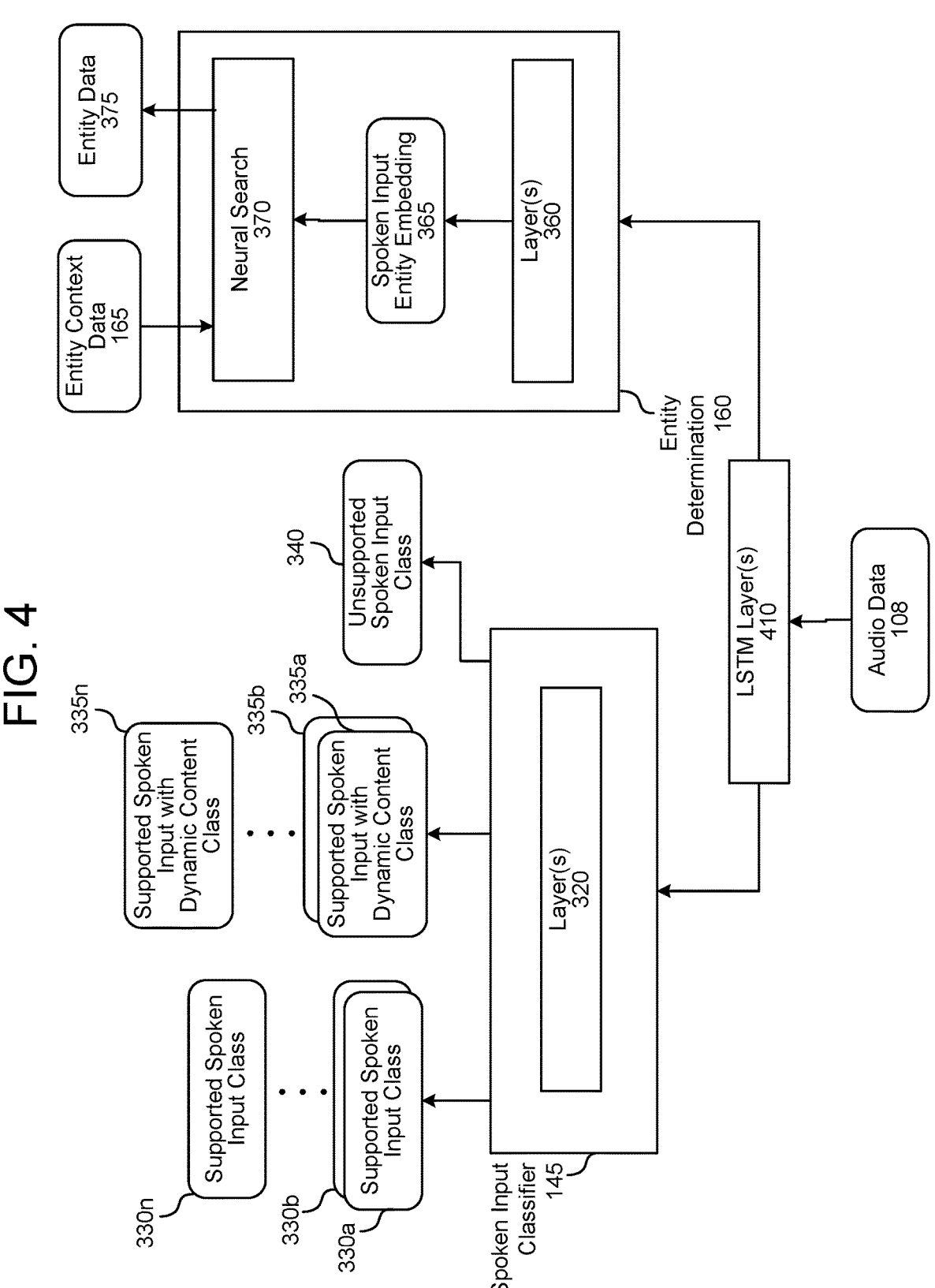
FIG. 4 is a conceptual diagram illustrating example components of the SLU component, according to another example embodiment of the present disclosure.

FIG. 4 is a conceptual diagram illustrating example components of the SLU component 140, according to another example embodiment of the present disclosure. In an example embodiment, the spoken input classifier 145 and the entity determination component 160 may share one or more LSTM layers 410 for processing the audio data 108, and generating audio embedding data that is inputted to and further processed by the spoken input classifier 145 and the entity determination component 160. In an example embodiment, the LSTM layer(s) 410 may be a recurrent encoder with three unidirectional LSTMs.

In some embodiments, the audio embedding data outputted by the LSTM layer(s) 410 may be used by other components (e.g., a user recognition component 795, a wakeword detection component 620, etc.) of the device 110 for processing to be performed with respect to the audio data 108. In some embodiments, the audio embedding data outputted by the LSTM layer(s) 410 may be used by the system 120 for further processing.

Figure 5:
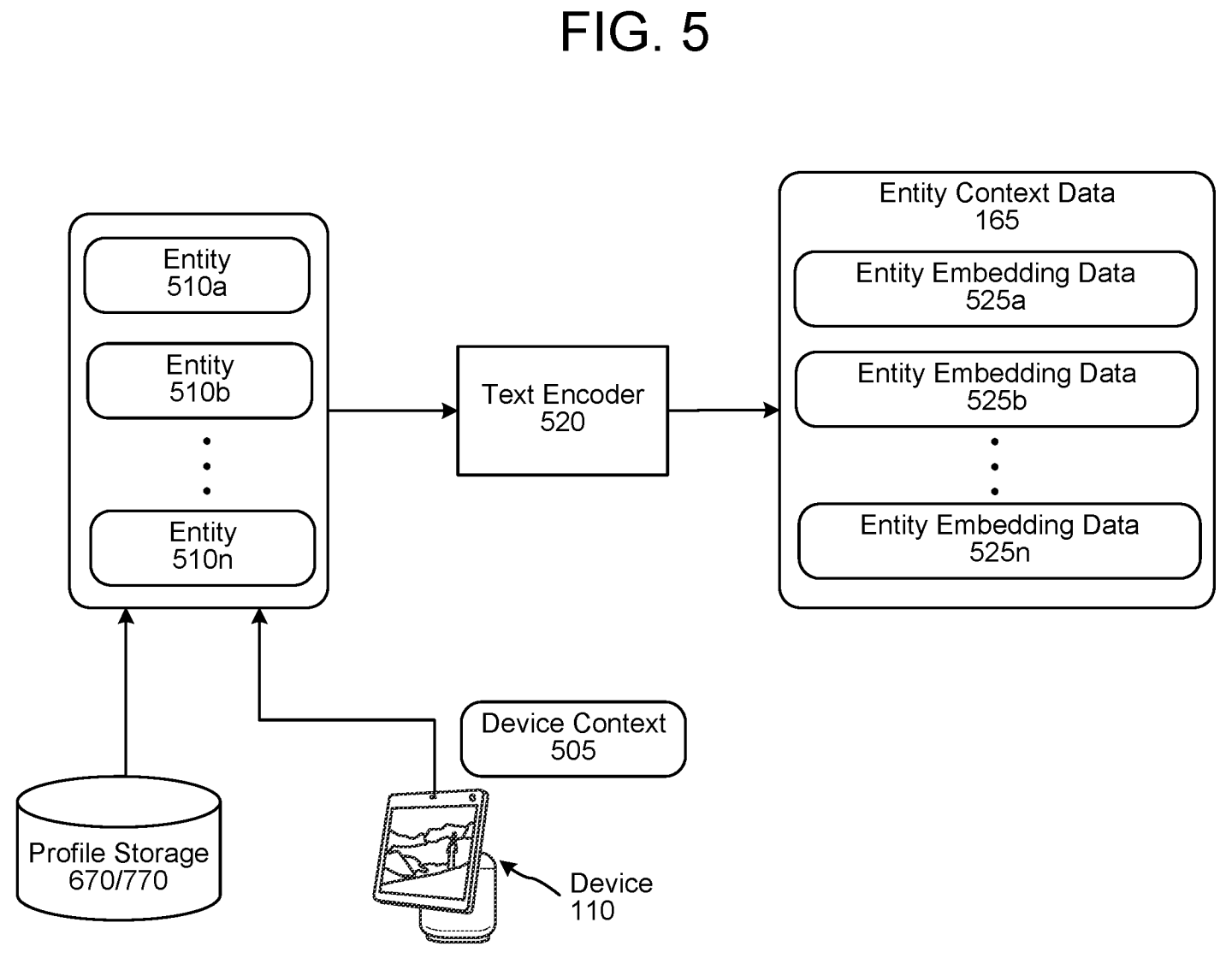

FIG. 5 is a conceptual diagram illustrating an example of how the entity context data 165 may be generated, according to embodiments of the present disclosure. As described above, one or more entities 510 may be determined to be included in the entity context data 165. The entities may be determined from device context data 505 associated with the device 110. Additionally or alternatively, the entities 510 may be determined from the user profile data associated with the user 105 and stored in the profile storage 670/770. The device context data 505 may include one or more entities (e.g., visual media titles, audio media titles, skills, applications, etc.) that are displayed at the device 110 (or using a display associated therewith) when the spoken input is received by the device 110. The entities 510 may be text data representing the respective entity. In other embodiments, the entities 510 may be token data or other natural language representation data.

A text encoder 520 (illustrated in FIG. 5) may process each of the entities 510 to generate corresponding entity embedding data 525. For example, the text encoder 520 may process the entity 510a to generate the entity embedding data 525a, the entity 510b to generate the entity embedding data 525b, and so on. The entity embedding data 525 may be included in the entity context data 165.

In some embodiments, the text encoder 520 may first convert the entity 510 to wordpieces using a wordpiece model, which is then inputted to an embedding layer that converts the wordpiece to 128-dimensional representations. The embedding layer may be followed by a recurrent encoder with two bidirectional LSTMs of 256 units. The output of this layer may be fed to a linear feed-forward layer of 256 units. The output of the feed-forward layer may be normalized before being outputted as the entity embedding data 525.

In some embodiments, the text encoder 520 may be included in the SLU component 140. In other embodiments, the text encoder 520 may provide the entity context data 165 as an input to the SLU component 140.

In some embodiments, the text encoder 520 may execute when or after the spoken input is received by the device 110. In such cases, the entities 510 may be entities displayed at the device 110 (or using a display associated therewith) when the spoken input is captured. In such cases, the entity context data 165 and the entity embedding data 525 may be updated when the device 110 display updates. In other embodiments, the text encoder 520 may execute before the spoken input is received by the device 110. In such cases, the entities 510 may be entities from the user profile data. Further in such cases, the entity context data 165 may be stored prior to receiving the spoken input.

In yet other embodiments, the text encoder 520 may process multiple different entities 510 from the user profile data and the device context data 505, where the entities 510 may not be selected based on the spoken input, and the text encoder 520 may process prior to the spoken input being received. The entity embedding data 525 corresponding to the entities 510 may be stored. When a spoken input is received by the device 110, the SLU component 140 may select (as described above in relation to FIG. 2) one or more of the stored entity embedding data 525 based on one or more entities found to be relevant for processing the spoken input.

In some embodiments, the entity determination component 160 and the text encoder 520 may be trained together with the goal that when an entity in a training audio embedding matches an entity represented in a training text embedding, then audio embeddings (by the entity determination component 160) and text embeddings (by the text encoder 520) are generated to be similar.

For training the entity determination component 160 and the text encoder 520, spoken inputs with dynamic content may be used. For example, training audio data representing spoken inputs "Play [movie title]" where the spoken inputs mention a different movie title, and training text data representing the different movie titles may be included in the training audio data, where the training audio data may be associated with the respective training text data based on the specific movie title. The following loss function may be used in some embodiments:

$$L(A,B,N)=\max(\|A-P\|^2-\|A-N\|^2+\alpha,0) \tag{1}$$

In above function 1, the anchor input A is the audio embedding, the positive sample input P is the text embedding for the entity that matches the entity spoken in the audio, and N is the negative text embeddings (i.e., entities that do not match the audio). The learning rate may be set to $10^{-3}$ and early stopping with 10 epochs patience may be used. The margin a may be set to 0.6 or another value.

Although the above describes the SLU component 140 being implemented at the device 110, a similar component or similar processing (i.e., classifying of the spoken input and determining entity data based on context information) may be performed by the system 120.

Figure 6:
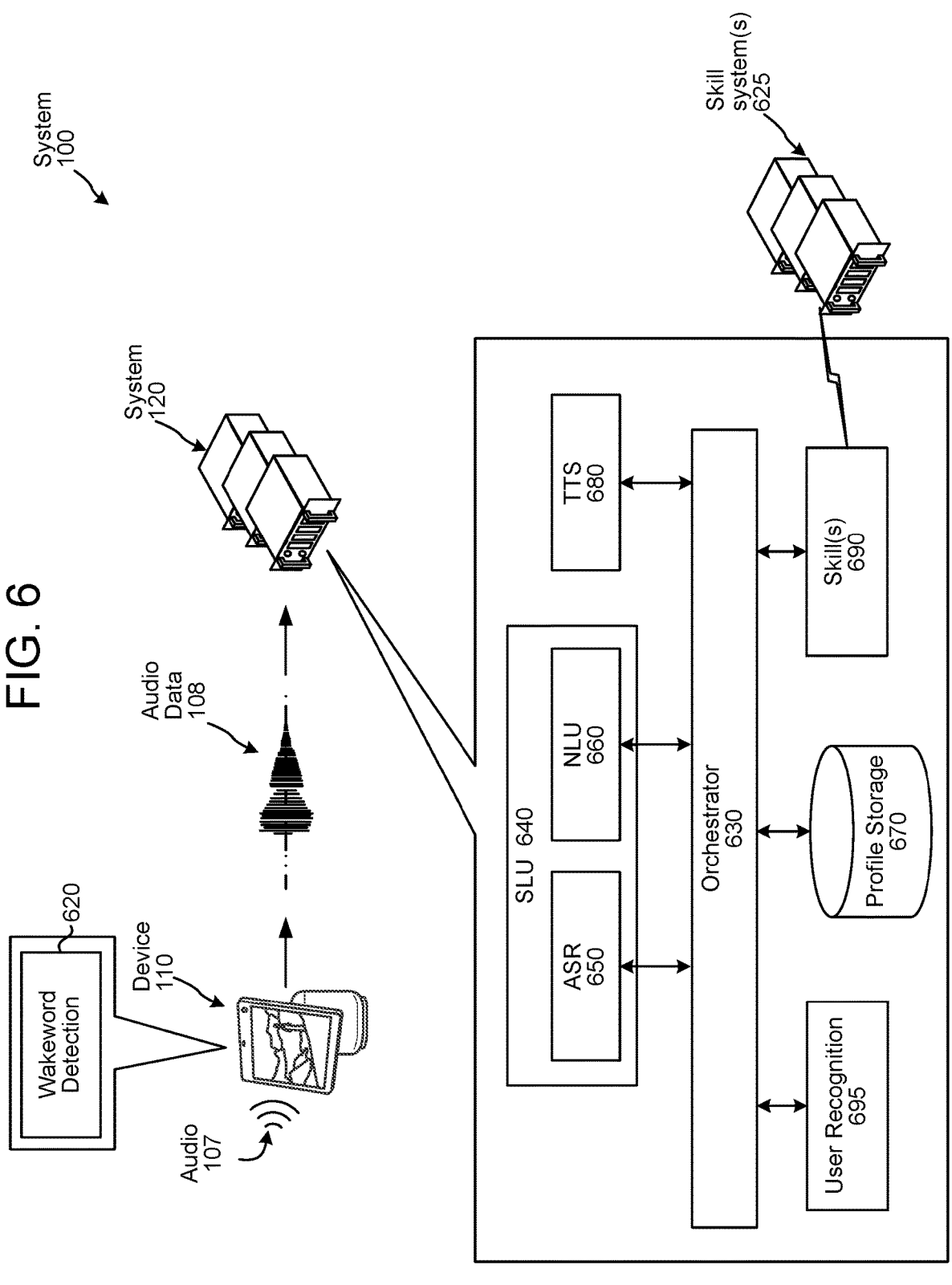
FIG. 6 is a conceptual diagram of components of a system, according to embodiments of the present disclosure.

The system 100 may operate using various components as illustrated in FIG. 6. The various components may be located on a same or different physical devices. Communication between various components may occur directly or across a network(s) 199.

A microphone or array of microphones (of or otherwise associated with the device 110) may capture audio. The device 110 processes audio data, representing the audio 107, to determine whether speech is detected. The device 110 may use various techniques to determine whether audio data includes speech. In some examples, the device 110 may apply voice activity detection (VAD) techniques.

Once speech is detected in audio data, the device 110 may determine if the speech is directed at the device 110/system 120. In at least some embodiments, such determination may be made using the wakeword detection component 620. The wakeword detection component 620 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 620 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example, the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 620 detects a wakeword, the device 110 may "wake" and begin transmitting audio data 108, representing the audio 107, to the system 120 or to other components included in the device 110. The audio data 108 may include the detected wakeword, or the device 110 may remove the portion of the audio data, corresponding to the detected wakeword, prior to sending the audio data 108 to the system 120/other components of the device 110.

In other examples, the user 105 may provide another type of input, such as selection of a button, selection of displayed graphical interface elements, typing an input, performing a gesture, etc. Input data corresponding to the provided input may be sent by the device 110 to the system 120 for processing.

The system 120 may include an orchestrator component 630 configured to, among other things, coordinate data transmissions between components of the system 120. The orchestrator component 630 may receive the audio data 108 from the device 110, and send the audio data 108 to an ASR component 650.

The ASR component 650 transcribes the audio data 108 into ASR data including one or more ASR hypotheses. An ASR hypothesis may be configured as a textual interpretation of the speech in the audio data 108, or may be configured in another manner, such as one or more tokens. Each ASR hypothesis may represent a different likely interpretation of the speech in the audio data 108. Each ASR hypothesis may be associated with a score (e.g., confidence score, probability score, or the like) representing the associated ASR hypothesis correctly represents the speech in the audio data 108.

The ASR component 650 interprets the speech in the audio data based on a similarity between the audio data and pre-established language models. For example, the ASR component 650 may compare the audio data 108 with models for sounds (e.g., subword units, such as phonemes, etc.) and sequences of sounds to identify words that match the sequence of sounds of the speech represented in the audio data. In some embodiments, the ASR component 650 may use acoustic models and language models to determine one or more words represented in the speech in the audio data.

In some embodiments, the ASR component 650 may use a neural network, such as, a recurrent neural network (RNN) (or other type of neural networks) to determine the ASR data corresponding to the speech captured in the audio data. In some embodiments, the ASR component 650 may use a RNN-transducer model, which may feed the prediction from a previous time step (e.g., a predicted token corresponding to a previous audio frame) an input layer to process the next time step (e.g., to predict the next token corresponding to the subsequent/next audio frame).

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 630. The orchestrator component 630 may send the text data or ASR data, depending on the type of natural language input received, to a NLU component 660.

The NLU component 660 processes the ASR data or text data to determine one or more NLU hypotheses embodied in NLU output data. The NLU component 660 may perform intent classification (IC) processing on the ASR output data or text data to determine an intent of the natural language input. An intent corresponds to an action to be performed that is responsive to the natural language input. To perform IC processing, the NLU component 660 may communicate with a database of words linked to intents. For example, a music intent database may link words and phrases such as "quiet," "volume off," and "mute" to a <Mute> intent. The NLU component 660 identifies intents by comparing words and phrases in ASR output data or text data to the words and phrases in an intents database. In some embodiments, the NLU component 660 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 660 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 660 may be linked to one or more grammar frameworks with entity types to be populated with entity values. Each entity type of a grammar framework corresponds to a portion of ASR output data or text data that the NLU component 660 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 660 may perform NER processing to identify words in ASR output data or text data as subject, object, verb, preposition, etc. based on grammar rules and/or models. Then, the NLU component 660 may perform IC processing using the identified verb to identify an intent. Thereafter, the NLU component 660 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 660 may generate NLU output data including one or more NLU hypotheses, with each NLU hypothesis including an intent and optionally one or more entity types and corresponding entity values. In some embodiments, the NLU component 660 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 650 and the NLU component 660). In at least some embodiments, the system 120 may implement a spoken language understanding (SLU) component configured to process audio data 108 to determine NLU output data.

The SLU component may be equivalent to a combination of the ASR component 650 and the NLU component 660. Yet, the SLU component may process audio data 108 and directly determine the NLU output data, without an intermediate step of generating ASR output data. As such, the SLU component may take audio data 108 representing a spoken natural language input and attempt to make a semantic interpretation of the spoken natural language input. That is, the SLU component may determine a meaning associated with the spoken natural language input and then implement that meaning. For example, the SLU component may interpret audio data 108 representing a spoken natural language input in order to derive a desired action. The SLU component may output a most likely NLU hypothesis, or multiple NLU hypotheses associated with respective confidence or other scores (such as probability scores, etc.).

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

The system 120 may include one or more skill components 690 and/or may communicate with one or more skill systems 625. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 690 may operate in conjunction between the system 120 and other devices, such as the device 110, a restaurant electronic ordering system, a taxi electronic booking system, etc. in order to complete certain functions. Inputs to a skill 690 may come from speech processing interactions or through other interactions or input sources.

A skill 690 may be associated with a domain, a non-limiting list of which includes a smart home domain, a music domain, a video domain, a weather domain, a communications domain, a flash briefing domain, a shopping domain, and a custom domain.

The system 120 may include a TTS component 680 that generates audio data including synthesized speech. The data input to the TTS component 680 may come from a skill system 625, the orchestrator component 630, or another component of the system 120.

In one method of synthesis called unit selection, the TTS component 680 matches input data against a database of recorded speech. The TTS component 680 selects matching units of recorded speech and concatenates the units together to form audio data. In another method of synthesis called parametric synthesis, the TTS component 680 varies parameters such as frequency, volume, and noise to determine audio data including an artificial speech waveform. Parametric synthesis uses a computerized voice generator, sometimes called a vocoder.

The system 120 may include a user recognition component 695. The user recognition component 695 may recognize one or more users using various data. The user recognition component 695 may take as input the audio data 108. The user recognition component 695 may perform user recognition by comparing speech characteristics, in the audio data 108, to stored speech characteristics of users. The user recognition component 695 may additionally or alternatively perform user recognition by comparing biometric data (e.g., fingerprint data, iris data, retina data, etc.), received by the system 120 in correlation with a natural language input, to stored biometric data of users. The user recognition component 695 may additionally or alternatively perform user recognition by comparing image data (e.g., including a representation of at least a feature of a user), received by the system 120 in correlation with a natural language input, with stored image data including representations of features of different users. The user recognition component 695 may perform other or additional user recognition processes, including those known in the art. For a particular natural language input, the user recognition component 695 may perform processing with respect to stored data of users associated with the device 110 that received the natural language input.

The user recognition component 695 determines whether a natural language input originated from a particular user. For example, the user recognition component 695 may determine a first value representing a likelihood that a natural language input originated from a first user, a second value representing a likelihood that the natural language input originated from a second user, etc. The user recognition component 695 may also determine an overall confidence regarding the accuracy of user recognition processing.

The user recognition component 695 may output a single user identifier corresponding to the most likely user that originated the natural language input. Alternatively, the user recognition component 695 may output multiple user identifiers (e.g., in the form of an N-best list) with respective values representing likelihoods of respective users originating the natural language input. The output of the user recognition component 695 may be used to inform NLU processing, processing performed by a skill system 625, as well as processing performed by other components of the system 120 and/or other systems.

The system 120 may include profile storage 670. The profile storage 670 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 670 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skill systems 625 that the user has enabled. When a user enables a skill system 625, the user is providing the system 120 with permission to allow the skill system 625 to execute with respect to the user's natural language inputs. If a user does not enable a skill system 625, the system 120 may not execute the skill system 625 with respect to the user's natural language inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 670 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The foregoing describes illustrative components and processing of the system 120. The following describes illustrative components and processing of the device 110. As illustrated in FIG. 7, in at least some embodiments the system 120 may receive the audio data 108 from the device 110, to recognize speech corresponding to a spoken natural language in the received audio data 108, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 6, the device 110 may include a wakeword detection component 620 configured to detect a wakeword (e.g., "Alexa") that indicates to the device 110 that the audio data 108 is to be processed for determining NLU output data. In at least some embodiments, a hybrid selector 724, of the device 110, may send the audio data 108 to the wakeword detection component 620. If the wakeword detection component 620 detects a wakeword in the audio data 108, the wakeword detection component 620 may send an indication of such detection to the hybrid selector 724. In response to receiving the indication, the hybrid selector 724 may send the audio data 108 to the system 120 and/or the SLU component 140. The wakeword detection component 620 may also send an indication, to the hybrid selector 724, representing a wakeword was not detected. In response to receiving such an indication, the hybrid selector 724 may refrain from sending the audio data 108 to the system 120, and may prevent the SLU component 140 from processing the audio data 108. In this situation, the audio data 108 can be discarded.

The device 110 may conduct its own speech processing using on-device language processing components, such as the SLU component 140 described herein. The device 110 may also internally include, or otherwise have access to, other components such as one or more skill components 790, a TTS component 780 (configured to process in a similar manner to the TTS component 680), a user recognition component 795 (configured to process in a similar manner to the user recognition component 695), profile storage 770 (configured to store similar profile data to the profile storage 670), and other components. In at least some embodiments, the profile storage 770 may only store profile data for a user or group of users specifically associated with the device 110. Some of the components included in the device 110 may be customized or specifically configured for the user 105 or a group of users associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 724, of the device 110, may include a hybrid proxy (HP) 726 configured to proxy traffic to/from the system 120. For example, the HP 726 may be configured to send messages to/from a hybrid execution controller (HEC) 727 of the hybrid selector 724. For example, command/directive data received from the system 120 can be sent to the HEC 727 using the HP 726. The HP 726 may also be configured to allow the audio data 108 to pass to the system 120 while also receiving (e.g., intercepting) this audio data 108 and sending the audio data 108 to the HEC 727.

In at least some embodiments, the hybrid selector 724 may further include a local request orchestrator (LRO) 728 configured to notify the SLU component 140 about the availability of the audio data 108, and to otherwise initiate the operations of on-device language processing when the audio data 108 becomes available. In general, the hybrid selector 724 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 108 is received, the HP 726 may allow the audio data 108 to pass through to the system 120 and the HP 726 may also input the audio data 108 to the SLU component 140 by routing the audio data 108 through the HEC 727 of the hybrid selector 724, whereby the LRO 728 notifies the SLU component 140 of the audio data 108. At this point, the hybrid selector 724 may wait for response data from either or both the system 120 and/or the on-device language processing components. However, the disclosure is not limited thereto, and in some examples the hybrid selector 724 may send the audio data 108 only to the SLU component 140 without departing from the disclosure. For example, the device 110 may process the audio data 108 on-device without sending the audio data 108 to the system 120.

The SLU component 140 is configured to receive the audio data 108 from the hybrid selector 724, and to determine an intent from the audio data (an optionally one or more named entities). The device 110 may determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the SLU component 140) may be selected as usable to respond to a natural language input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 108 to the system 120, and the response data from the system 120 may include the unique identifier to identify to which natural language input the response data corresponds.

In at least some embodiments, the device 110 may include one or more skill systems 625 that may process similarly to the speech processing system-implemented skill(s) 625. The skill(s) 625 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
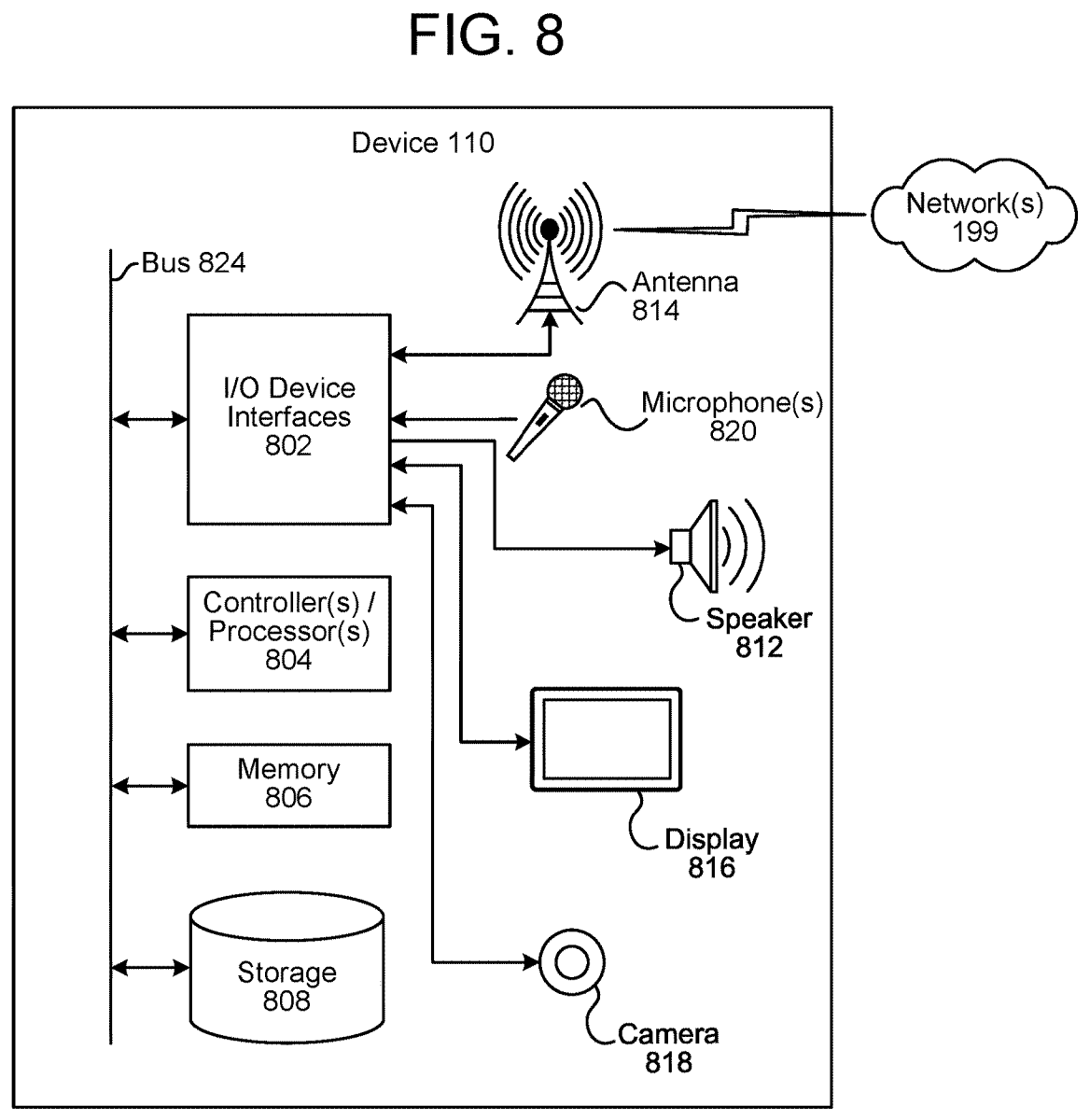
Figure 9:
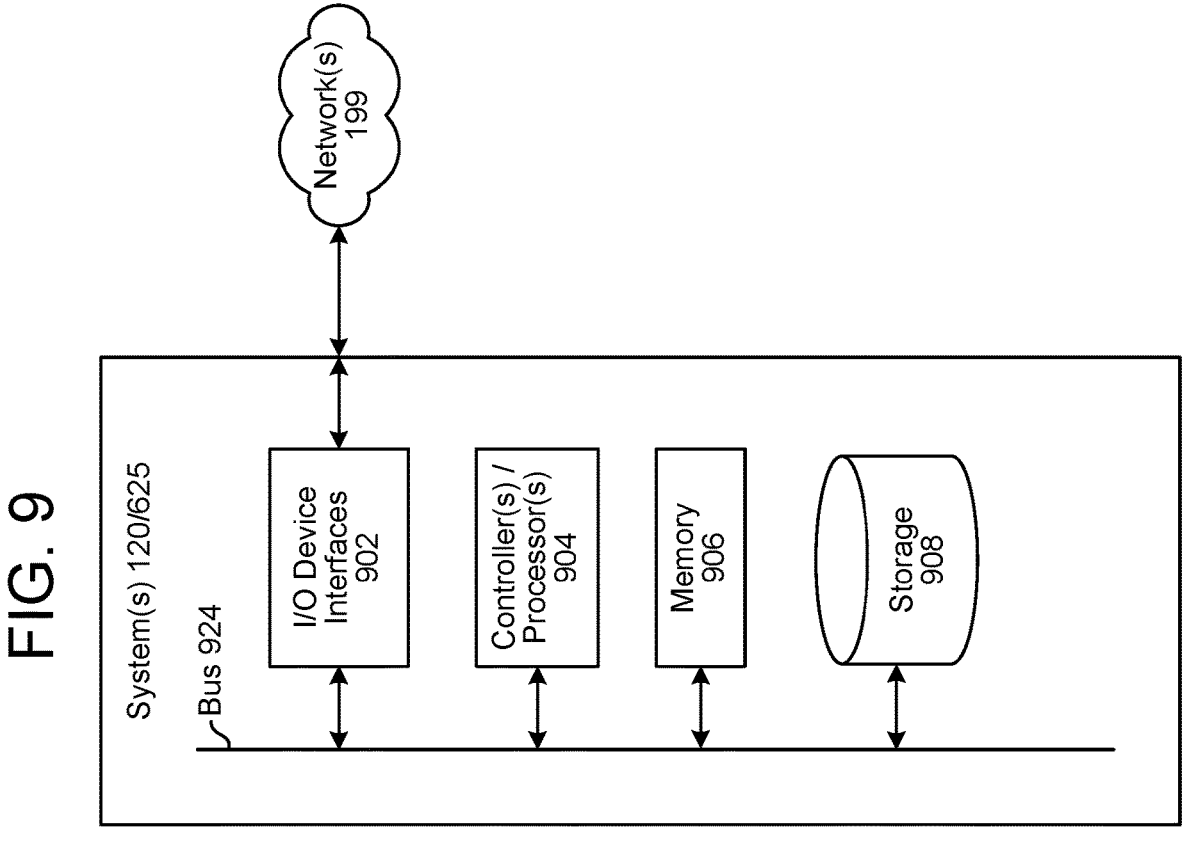
FIG. 9 is a block diagram conceptually illustrating example components of a system, according to embodiments of the present disclosure.

FIG. 8 is a block diagram conceptually illustrating a device 110 of the system 100. FIG. 9 is a block diagram conceptually illustrating example components of a system, such as the system 120 and the skill(s) system 625. A system (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/625) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/625) may be included in the system 100 of the present disclosure, such as, one or more systems 120 and/or one or more skills 625. In operation, each of these systems may include computer-readable and computer-executable instructions that reside on the respective device (120/625), as will be discussed further below.

Each of these devices (110/120/625) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/625) may also include a data storage component (808/908) for storing data and controller/processor-executable instructions. Each data storage component (808/908) may individually include one or more non-volatile storage types such as magnetic storage, optical storage, solid-state storage, etc. Each device (110/120/625) may also be connected to removable or external non-volatile memory and/or storage (such as a removable memory card, memory key drive, networked storage, etc.) through respective input/output device interfaces (802/902).

Computer instructions for operating each device (110/120/625) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/625) includes input/output device interfaces (802/902). A variety of components may be connected through the input/output device interfaces (802/902), as will be discussed further below. Additionally, each device (110/120/625) may include an address/data bus (824/924) for conveying data among components of the respective device. Each component within a device (110/120/625) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120 and/or skill 625 may include their own dedicated processors, memory, and/or storage. Alternatively, one or more of the components of the device 110, the system 120 and/or skill 625 may utilize the I/O interfaces (802/902), processor(s) (804/904), memory (806/906), and/or storage (808/908) of the device 110, the system 120 and/or skill 625, respectively.

As noted above, multiple devices may be employed in a single system. In such a multi-device system, each of the devices may include different components for performing different aspects of the system's processing. The multiple devices may include overlapping components. The components of the device 110, the system 120 and the skill system 625, as described herein, are illustrative, and may be located as a stand-alone device or may be included, in whole or in part, as a component of a larger device or system.

As illustrated in FIG. 10, multiple devices (110a-110j, 120, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, the skill 625, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving, at a device, first audio data corresponding to a first spoken input;

determining, at the device and using a spoken language understanding (SLU) component, that the first audio data corresponds to a first category representing a first supported spoken input with dynamic content, wherein the SLU component is configured to classify the first audio data to:

the first category, a second category representing a first supported spoken input, and a third category representing an unsupported spoken input;

based on the first audio data corresponding to the first category, determining a first plurality of entities potentially corresponding to the first spoken input;

processing, at the device and using the SLU component, the first audio data with respect to the first plurality of entities to:

determine a portion of the first audio data corresponding to a mention of an entity, and determine that the portion of the first audio data represents a first entity of the first plurality of entities; and determining, at the device, a first intent corresponding to the first category.

2. The computer-implemented method of claim 1, further comprising:

receiving, at the device, second audio data corresponding to a second spoken input;

determining, at the device and using the SLU component, that the second audio data corresponds to the second category;

in response to determining that the second spoken input corresponds to the second category, determining, at the device and using stored data, a second intent and a second entity corresponding to the second category; and determining second output data using the second intent and the second entity.

3. The computer-implemented method of claim 1, further comprising:

receiving, at the device, second audio data corresponding to a second spoken input;

determining, at the device and using the SLU component, that the second audio data corresponds to the third category; and in response to determining that the second spoken input corresponds to the third category, sending the second audio data to a system for processing.

4. The computer-implemented method of claim 1, wherein determining the first plurality of entities potentially corresponding to the first spoken input further comprises:

determining, at the device, an entity type corresponding to the first category; and determining, at the device, the first plurality of entities based on the entity type.

5. The computer-implemented method of claim 1, wherein determining the first plurality of entities potentially corresponding to the first spoken input further comprises:

determining device context data representing the first plurality of entities being displayed at the device.

6. The computer-implemented method of claim 1, wherein determining the first plurality of entities potentially corresponding to the first spoken input further comprises:

determining the first plurality of entities using user profile data associated with the first spoken input.

7. The computer-implemented method of claim 1, wherein processing the first audio data further comprises:

determining audio embedding data corresponding to the first audio data;

determining text embedding data corresponding to the first plurality of entities, processing the audio embedding data and the text embedding data to determine a similarity value representing a similarity between the audio embedding data and a portion of the text embedding data corresponding to the first entity; and determining the first entity based on the similarity between the audio embedding data and the portion of the text embedding data.

8. The computer-implemented method of claim 1, further comprising:

determining, at the device, a first component configured to process the first intent and the first entity;

determining, at the device, first output data using the first component, the first intent and the first entity; and presenting the first output data in response to the first spoken input.

9. A system comprising:

at least one processor; and at least one memory including instructions that, when executed by the at least one processor, cause the system to:

receive first audio data corresponding to a first spoken input;

determine, using a spoken language understanding (SLU) component, that the first audio data corresponds to a first category representing a first supported spoken input with dynamic content, wherein the SLU component is configured to classify the first audio data to:

the first category, a second category representing a first supported spoken input, and a third category representing an unsupported spoken input;

based on the first audio data corresponding to the first category, determine a first plurality of entities potentially corresponding to the first spoken input;

process, using the SLU component, the first audio data with respect to the first plurality of entities to:

determine a portion of the first audio data corresponding to a mention of an entity, and determine that the portion of the first audio data represents a first entity of the first plurality of entities; and determine a first intent corresponding to the first category.

10. The system of claim 9, wherein the at least one memory includes further instructions that, when executed by the at least one processor, further cause the system to:

receive second audio data corresponding to a second spoken input;

determine, using the SLU component, that the second audio data corresponds to the second category;

in response to determining that the second spoken input corresponds to the second category, determine, using stored data, a second intent and a second entity corresponding to the second category; and determine second output data using the second intent and the second entity.

11. The system of claim 9, wherein the at least one memory includes further instructions that, when executed by the at least one processor, further cause the system to:

receive second audio data corresponding to a second spoken input;

determine, using the SLU component, that the second audio data corresponds to the third category; and in response to determining that the second spoken input corresponds to the third category, send the second audio data to another system for processing.

12. The system of claim 9, wherein the instructions that, when executed by the at least one processor, cause the system to determine the first plurality of entities potentially corresponding to the first spoken input further causes the system to:

determine an entity type corresponding to the first category; and determine the first plurality of entities based on the entity type.

13. The system of claim 9, wherein the instructions that, when executed by the at least one processor, cause the system to determine the first plurality of entities potentially corresponding to the first spoken input further cause the system to:

determine device context data representing the first plurality of entities being displayed at a device.

14. The system of claim 9, wherein the instructions that, when executed by the at least one processor, cause the system to determine the first plurality of entities potentially corresponding to the first spoken input further cause the system to:

determining the first plurality of entities using user profile data associated with the first spoken input.

15. The system of claim 9, wherein the instructions that, when executed by the at least one processor, cause the system to process the first audio data further cause the system to:

determine audio embedding data corresponding to the first audio data;

determine text embedding data corresponding to the first plurality of entities, process the audio embedding data and the text embedding data to determine a similarity value representing a similarity between the audio embedding data and a portion of the text embedding data corresponding to the first entity; and determine the first entity based on the similarity between the audio embedding data and the portion of the text embedding data.

16. The system of claim 9, wherein the at least one memory includes further instructions that, when executed by the at least one processor, further cause the system to:

determine a first component configured to process the first intent and the first entity;

determine first output data using the first component, the first intent and the first entity; and present the first output data in response to the first spoken input.

17. The computer-implemented method of claim 1, further comprising:

sending, from the device to a system component for processing, data indicating the first entity and the first intent; and receiving, by the device from the system component, output data corresponding to the first spoken input.

18. The computer-implemented method of claim 1, wherein determining the first plurality of entities potentially corresponding to the first spoken input further comprises:

determining device context data representing the first plurality of entities, wherein the device context data corresponds to content being output by the device.

19. The system of claim 9, wherein the at least one memory includes further instructions that, when executed by the at least one processor, further cause the system to:

send, from a device to a system component for processing, data indicating the first entity and the first intent; and receive, by the device from the system component, output data corresponding to the first spoken input.

20. The system of claim 9, wherein the instructions that, when executed by the at least one processor, cause the system to determine the first plurality of entities potentially corresponding to the first spoken input further cause the system to:

determine device context data representing the first plurality of entities, wherein the device context data corresponds to content being output by a device.

* * * * *